(12) United States Patent
Taniguchi

(10) Patent No.: US 7,430,749 B2
(45) Date of Patent: Sep. 30, 2008

(54) DISK CONVEYANCE APPARATUS AND SUPPORT MEANS FOR SUPPORTING CONVEYANCE APPARATUS

(75) Inventor: Kazutoshi Taniguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 577 days.

(21) Appl. No.: 11/079,398

(22) Filed: Mar. 15, 2005

(65) Prior Publication Data

US 2005/0235305 A1 Oct. 20, 2005

(30) Foreign Application Priority Data

Apr. 16, 2004 (JP) .............................. 2004-121888

(51) Int. Cl.
G11B 7/085 (2006.01)
G11B 20/08 (2006.01)
(52) U.S. Cl. .................... 720/619; 369/30.6; 369/30.78
(58) Field of Classification Search ................ 720/619; 369/30.6, 30.78
See application file for complete search history.

(56) References Cited

U.S. PATENT DOCUMENTS

| 4,723,185 | A | * | 2/1988 | Maeda | 360/78.13 |
| 5,500,844 | A | * | 3/1996 | Kim et al. | 720/619 |
| 6,081,486 | A | * | 6/2000 | Fujisawa | 369/30.85 |
| 6,201,781 | B1 | * | 3/2001 | Abe | 720/673 |
| 6,414,929 | B1 | * | 7/2002 | Fujiwara | 720/607 |
| 6,449,234 | B1 | * | 9/2002 | Ahn et al. | 720/619 |
| 7,171,675 | B2 | * | 1/2007 | Satoh | 720/619 |
| 2002/0044518 | A1 | * | 4/2002 | Kabasawa | 369/77.1 |
| 2003/0090984 | A1 | * | 5/2003 | Lee et al. | 369/77.1 |
| 2003/0095490 | A1 | * | 5/2003 | Kobiyama | 369/77.1 |
| 2003/0095491 | A1 | * | 5/2003 | Adachi et al. | 369/77.1 |
| 2003/0165103 | A1 | * | 9/2003 | Becker et al. | 369/77.1 |
| 2005/0050561 | A1 | * | 3/2005 | Hirano et al. | 720/619 |

FOREIGN PATENT DOCUMENTS

JP 9-274760 A 10/1997

* cited by examiner

*Primary Examiner*—Andrea Wellington
*Assistant Examiner*—Matthew G Kayrish
(74) *Attorney, Agent, or Firm*—Birch, Stewart, Kolasch & Birch, LLP

(57) ABSTRACT

A disk apparatus includes a supporting mechanism inwardly projecting from an inner surface of a wall of a housing, the wall having a disk insertion/ejection opening, a disk conveying mechanism that is supported by the supporting mechanism so that the disk conveying mechanism can be moved along a disk conveyance path, via which a disk is conveyed, toward a predetermined position within the housing, an engagement groove formed in the supporting mechanism and having a straight portion parallel to the disk conveyance path and a locking portion perpendicular to the straight portion, a locking member that is rotatably disposed on the disk conveying mechanism and that is engaged with the engagement groove so that the locking member is pressed toward the locking portion of the engagement groove, and an actuation mechanism for rotating the locking member to release locking of the locking member when playing back the disk.

11 Claims, 40 Drawing Sheets

DISK CONVEYANCE APPARATUS AND SUPPORT MEANS FOR SUPPORTING CONVEYANCE APPARATUS

BACKGROUND OF THE INVENTION

1. Field of the Invention

The present invention relates to a disk apparatus that plays back information stored in a disk. More particularly, it relates to a disk apparatus that can be used with being mounted in a moving object, such as a motor vehicle.

2. Description of Related Art

Although a related art disk apparatus is provided with a disk conveying plate that moves toward an inner side of the disk apparatus when conveying a disk to a playback position within the disk apparatus, and that retracts from an area in the vicinity of the disk when playing back the disk placed at the playback position, the related art disk apparatus does not lock the disk conveying plate at a predetermined position when conveying the disk to the playback position within the disk apparatus.

Conventionally, there has been provided a recording and reproducing apparatus, as disclosed in, for example, patent reference 1, which can contain two or more disk cartridges each of which accommodates a disk therein, and which can record information on a disk and play back a disk. Although the prior art recording and reproducing apparatus includes an MD locking mechanism for locking an MD (or mini disk) to a caddy, an MD lock releasing mechanism for releasing the locking of the MD to the caddy, and an MD detecting mechanism for detecting whether or not a caddy has been loaded, it has no locking mechanism for locking a disk conveying plate.

[Patent reference 1] JP,09-274760,A (see paragraphs 0027 to 0033, and FIGS. 4 to 7)

The prior art disk apparatus moves the disk conveying plate to an inner side thereof in order to convey a disk to the playback position therein, but it does not lock the disk conveying plate at the position to which the disk conveying plate has been moved. A problem with the prior art disk apparatus is therefore that, when a certain force is exerted upon the disk conveying plate and the disk conveying plate therefore moves in a backward direction when conveying the disk to the predetermined playback position, the disk conveying plate cannot convey the disk to the predetermined playback position.

SUMMARY OF THE INVENTION

The present invention is made in order to solve the above-mentioned problem, and it is therefore an object of the present invention to provide a disk apparatus that can surely convey a disk to a predetermined position by locking a disk conveying mechanism when conveying the disk to the predetermined position.

In accordance with the present invention, there is provided a disk apparatus including: a supporting mechanism inwardly projecting from an inner surface of a wall of a housing, the wall having a disk insertion/ejection opening; a disk conveying mechanism that is supported by the supporting mechanism so that the disk conveying mechanism can be moved along a conveyance path, via which a disk is conveyed, toward a predetermined position within the housing; an engagement groove formed in the supporting mechanism and having a straight portion which is parallel to the conveyance path and a locking portion which is perpendicular to the straight portion; a locking member that is rotatably disposed on the disk conveying mechanism and that is engaged with the engagement groove so that the locking member is pressed toward the locking portion of the engagement groove; and an actuation mechanism for rotating the locking member so as to release locking of the locking member when playing back the disk.

Thus, since the disk apparatus in accordance with the present invention is so constructed as to, when conveying a disk to the predetermined position, lock the disk conveying mechanism at a predetermined position in the housing, and to release the locking of the disk conveying mechanism and retract the disk conveying mechanism to outside an area in which disks can be handled by the disk conveying mechanism when playing back the disk. Therefore, the disk apparatus in accordance with the present invention can certainly convey the disk to the predetermined position, and the reliability of the disk apparatus can be improved.

In addition, the operation of locking or releasing the locking of the disk conveying mechanism can be performed using an actuation member disposed for retracting the disk conveying mechanism to outside the area in which disks can be handled by the disk conveying mechanism, without having to provide a special-purpose component. In other words, the operation of moving the disk conveying mechanism and the operation of locking or releasing the locking of the disk conveying mechanism can be unified with the simple structure. Therefore, the reliability of the disk apparatus can be further improved.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
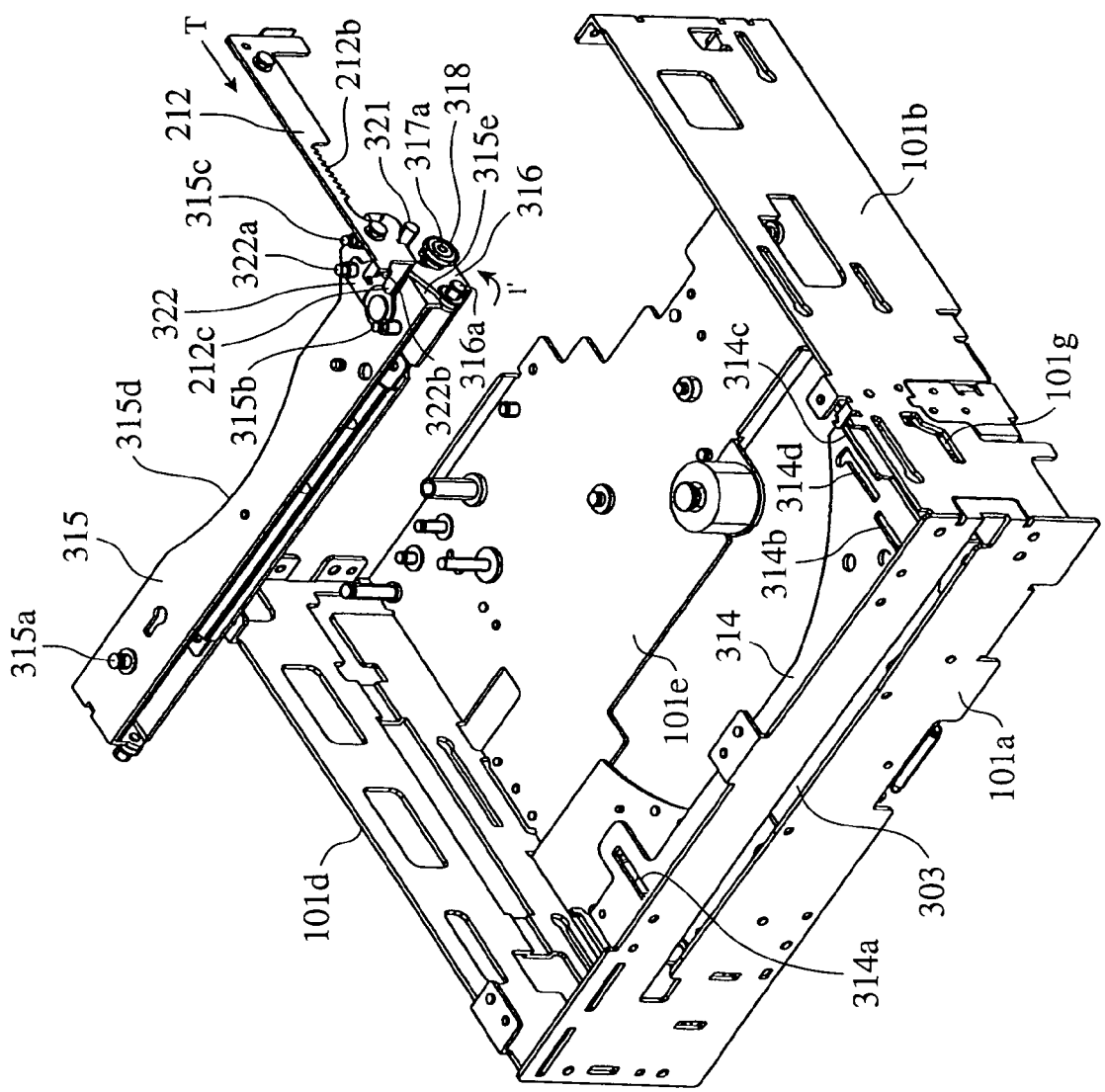
FIG. 1 is a perspective diagram showing a disk apparatus in accordance with the present invention in which a disk conveying mechanism is shown in spaced apart relation to a housing.
Figure 2:
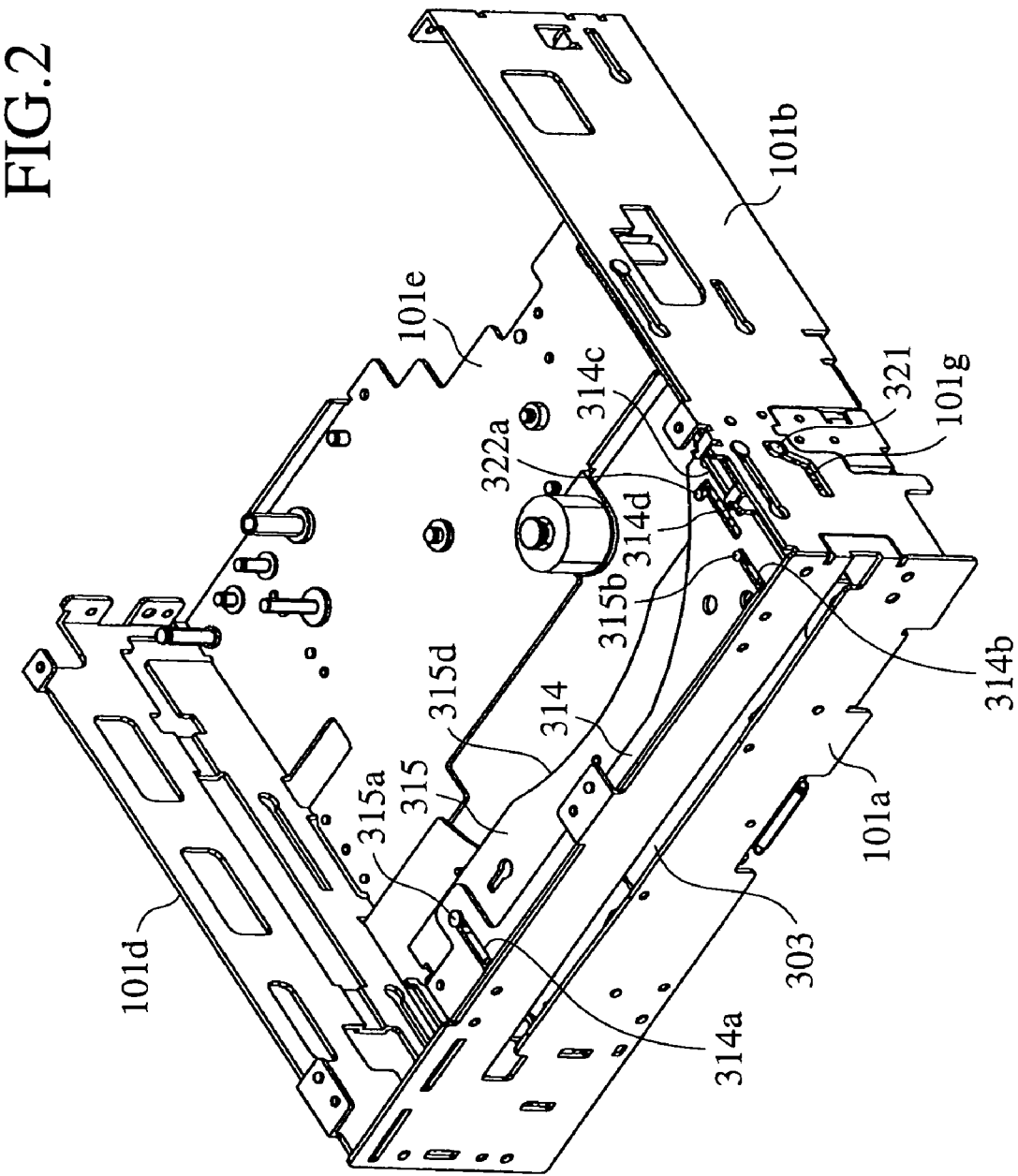
FIG. 2 is a perspective diagram showing the disk apparatus in accordance with the present invention in which the disk conveying mechanism is mounted in the housing.
Figure 3:
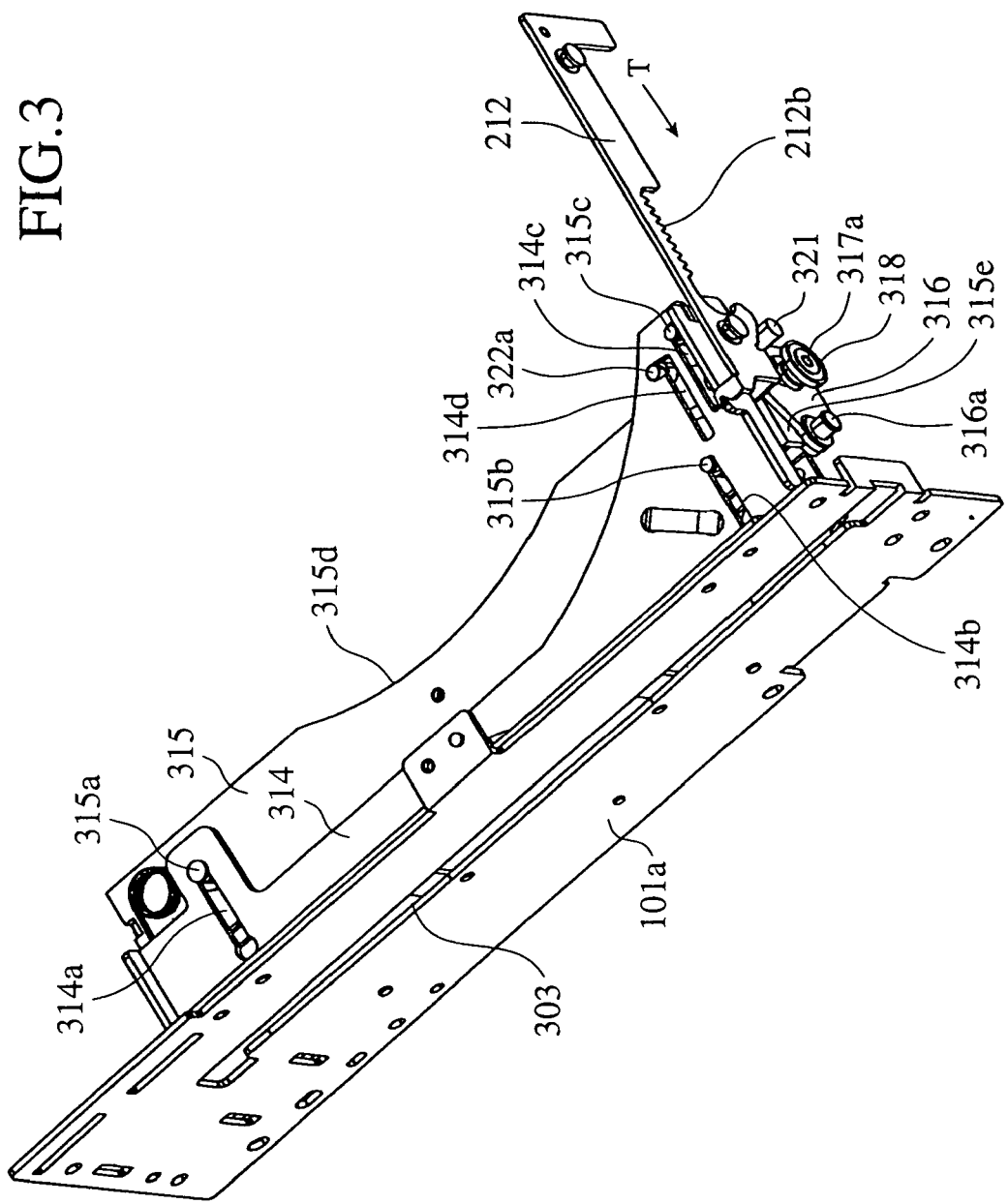
FIG. 3 is a perspective diagram showing the disk conveying mechanism.
Figure 4:
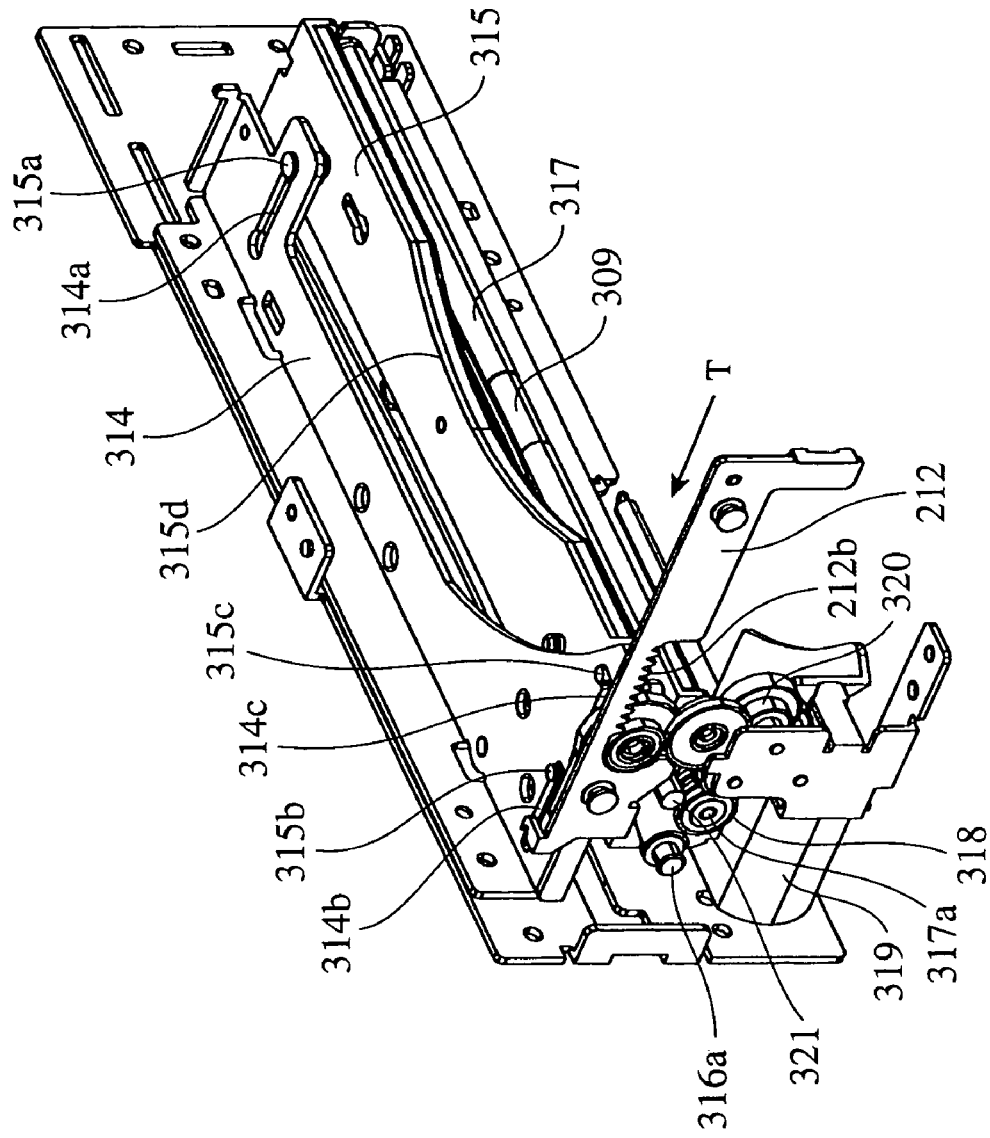
FIG. 4 is a perspective diagram showing the disk conveying mechanism when viewed from a direction different to that of FIG. 3.
Figure 5:
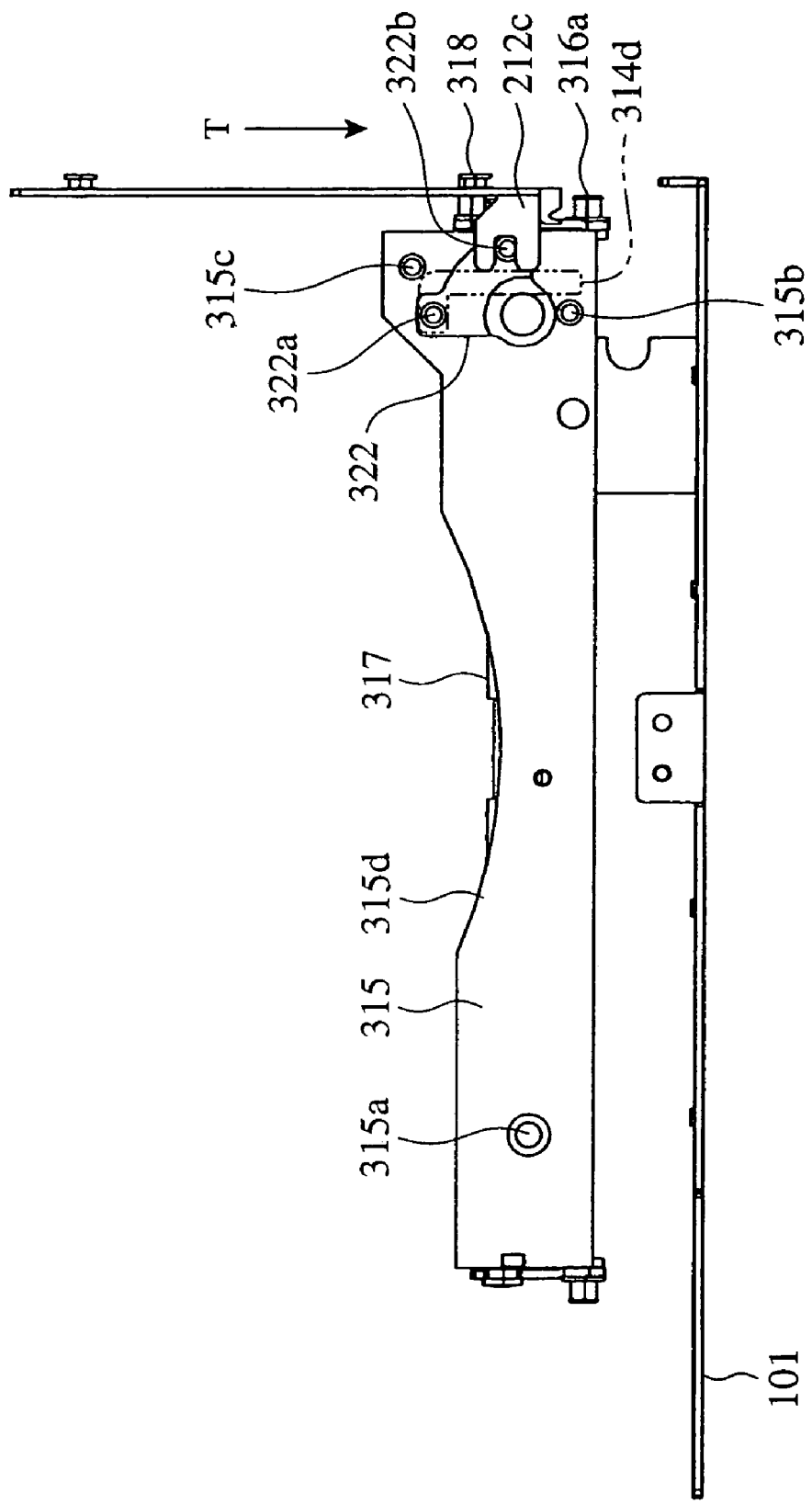
FIG. 5 is a plan view showing the disk conveying mechanism when conveying a disk.
Figure 6:
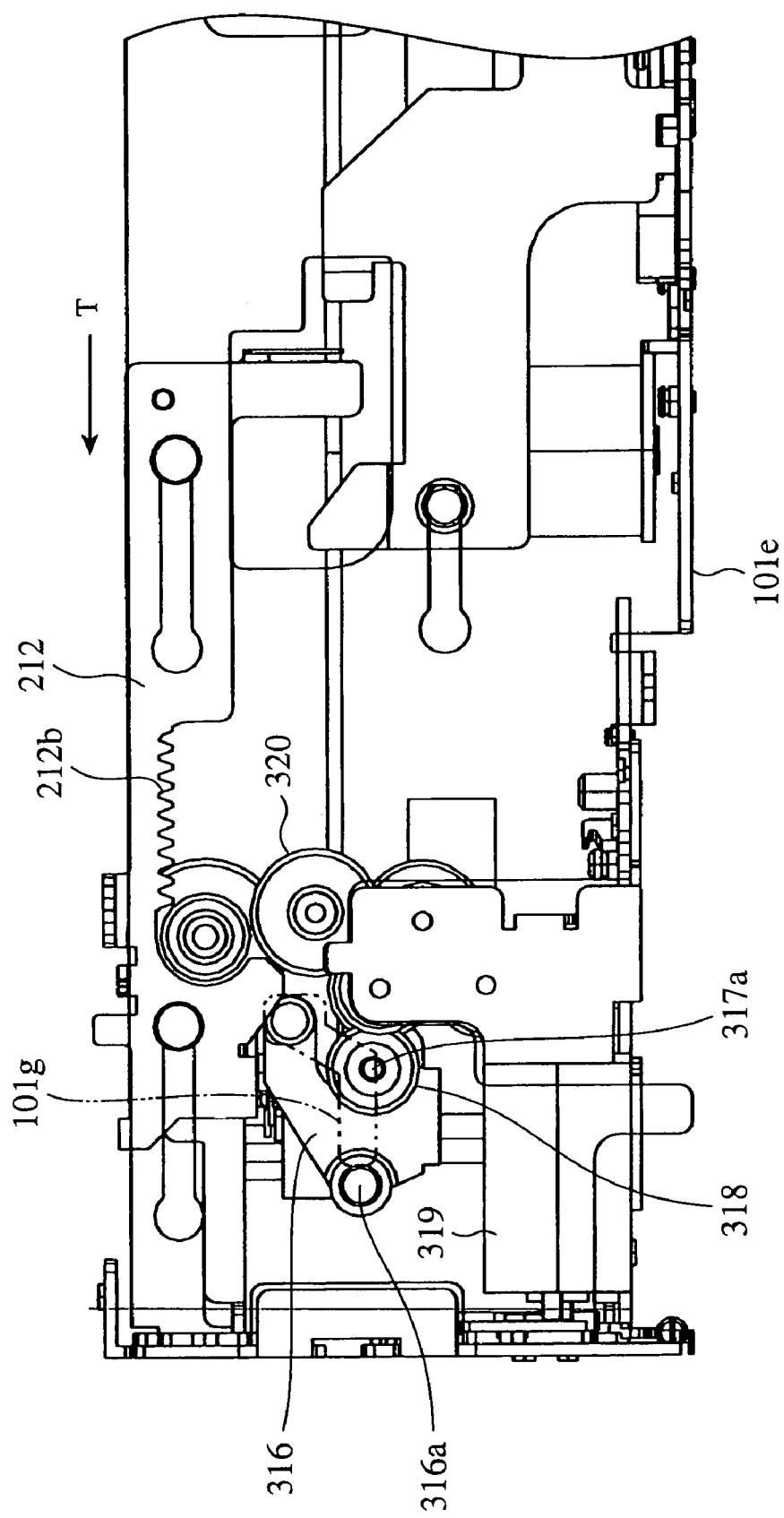
FIG. 6 is a side view of FIG. 5.
Figure 7:
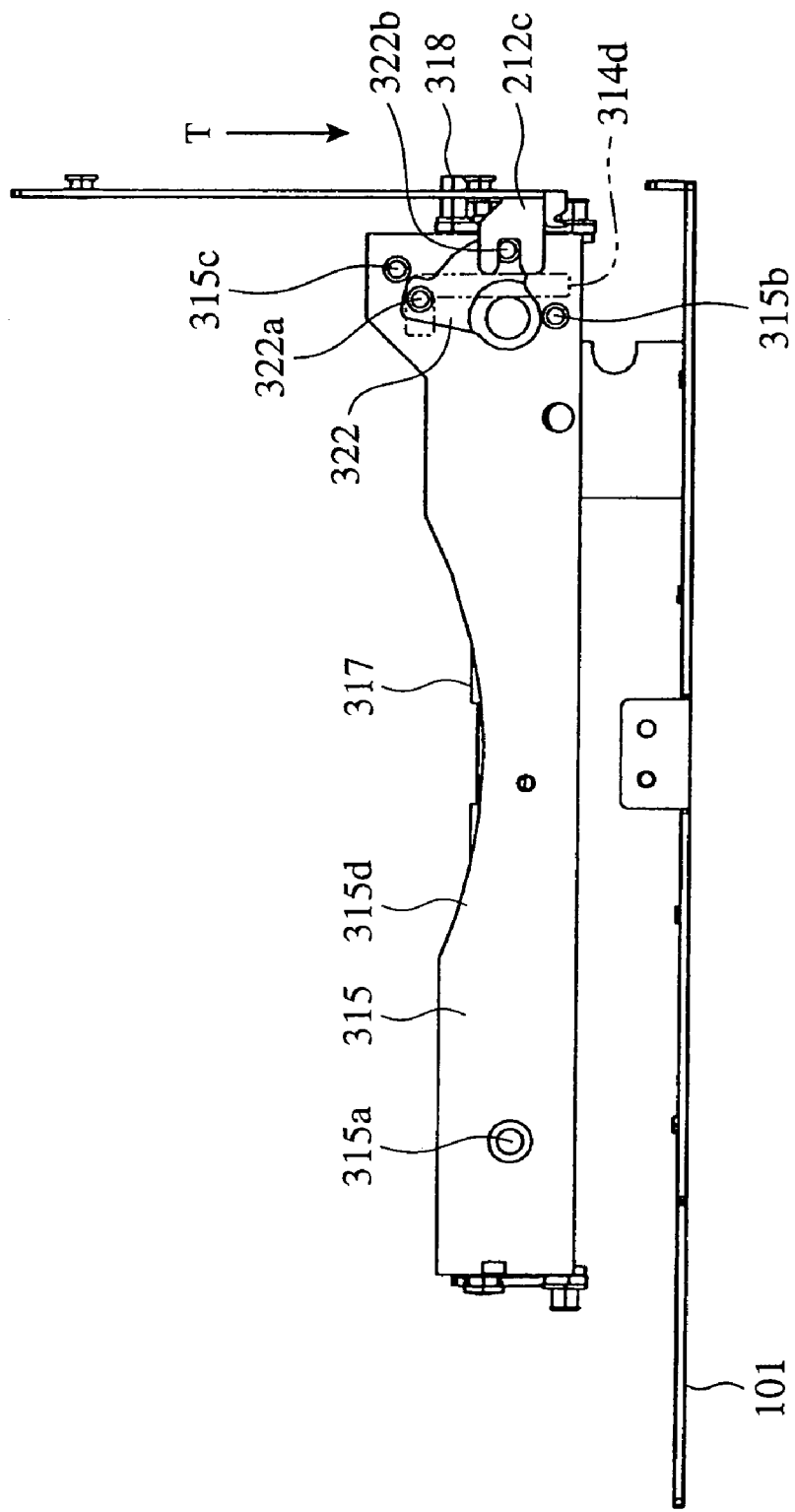
FIG. 7 is a plan view of the disk conveying mechanism which is placed in a state in which locking of the disk conveying mechanism is released.
Figure 8:
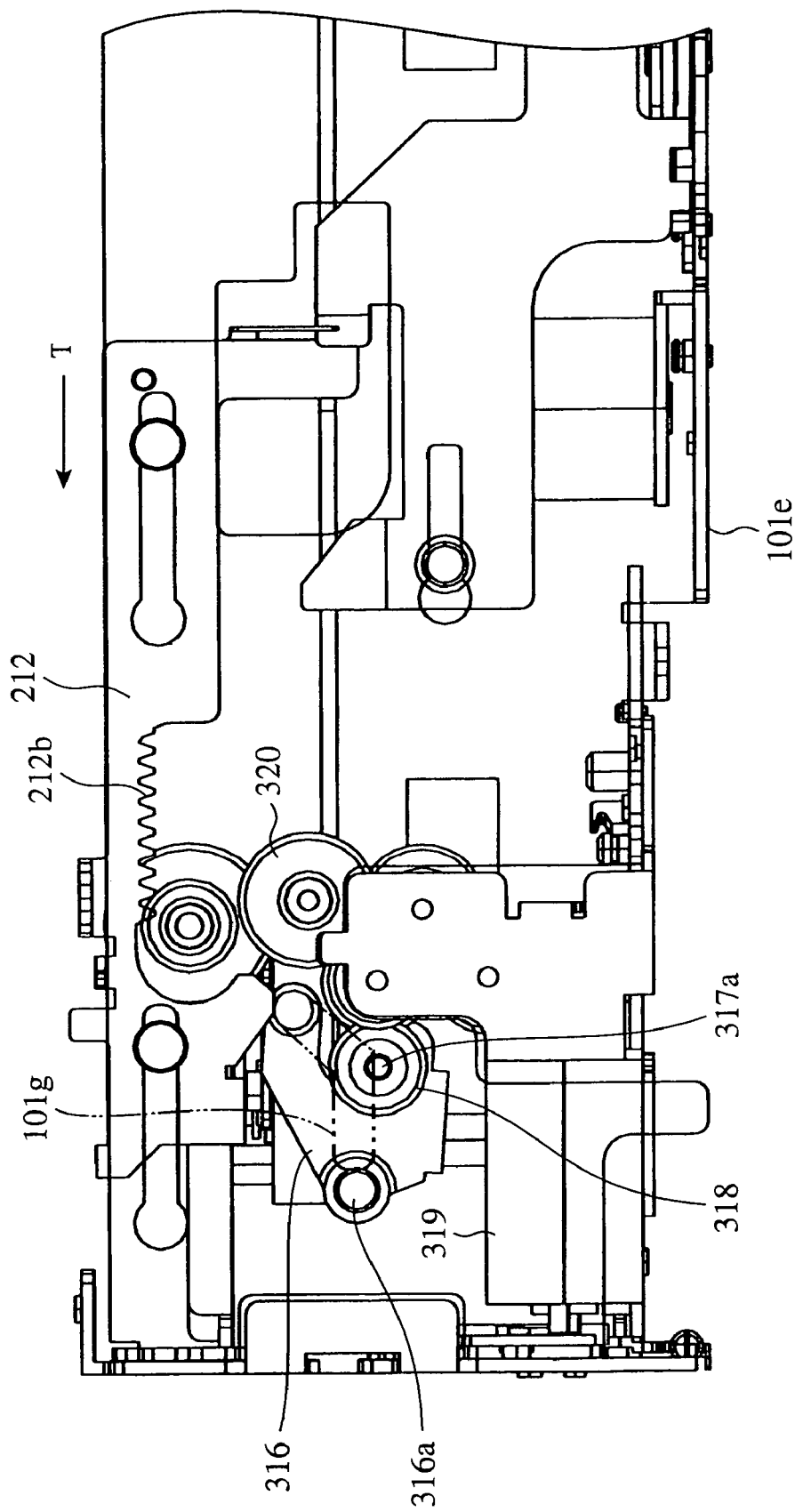
FIG. 8 is a side view of FIG. 7.
Figure 9:
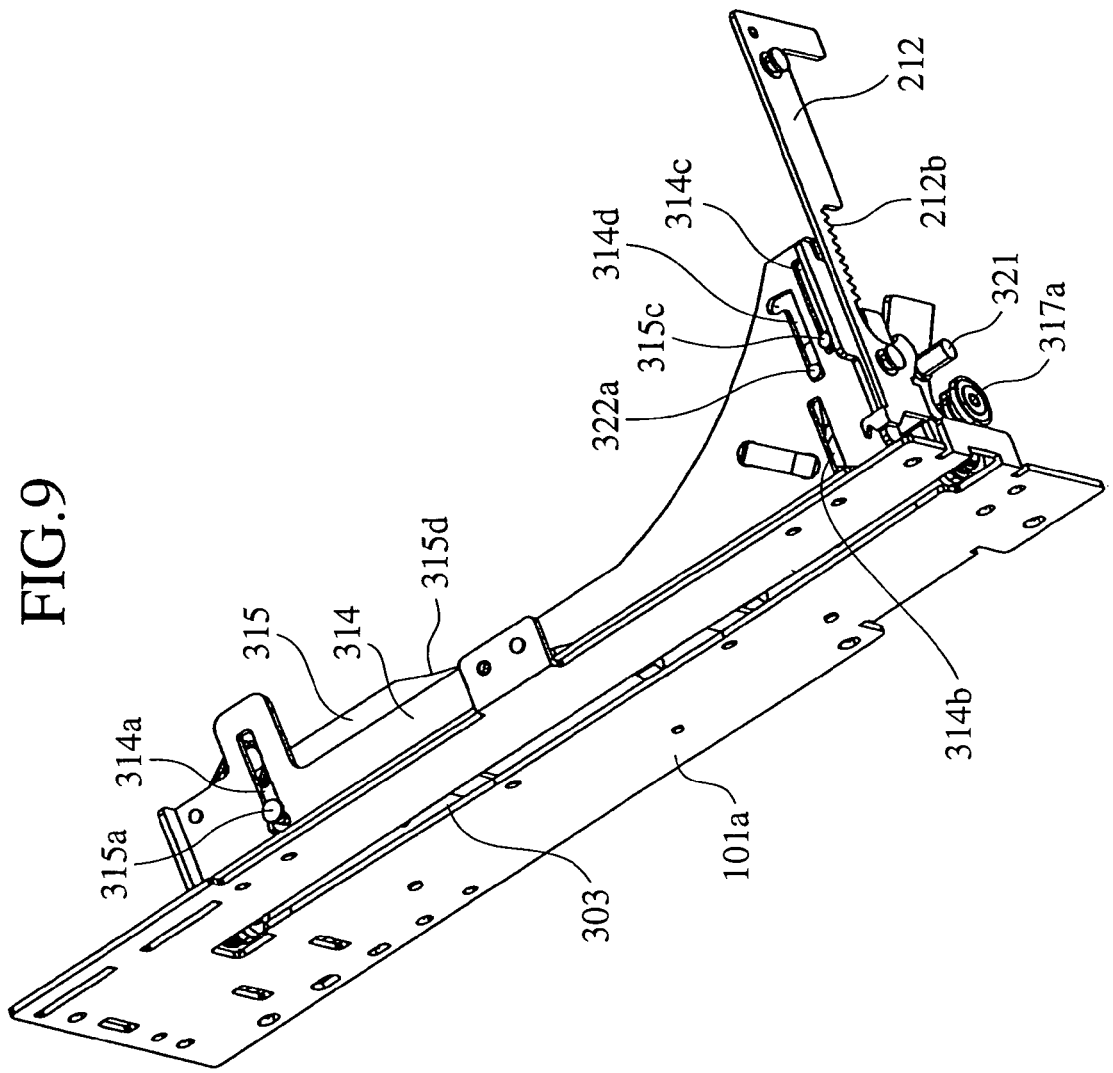
FIG. 9 is a perspective diagram showing a state in which the disk conveying mechanism is retracted to outside an area in which a disk can be handled.
Figure 10:
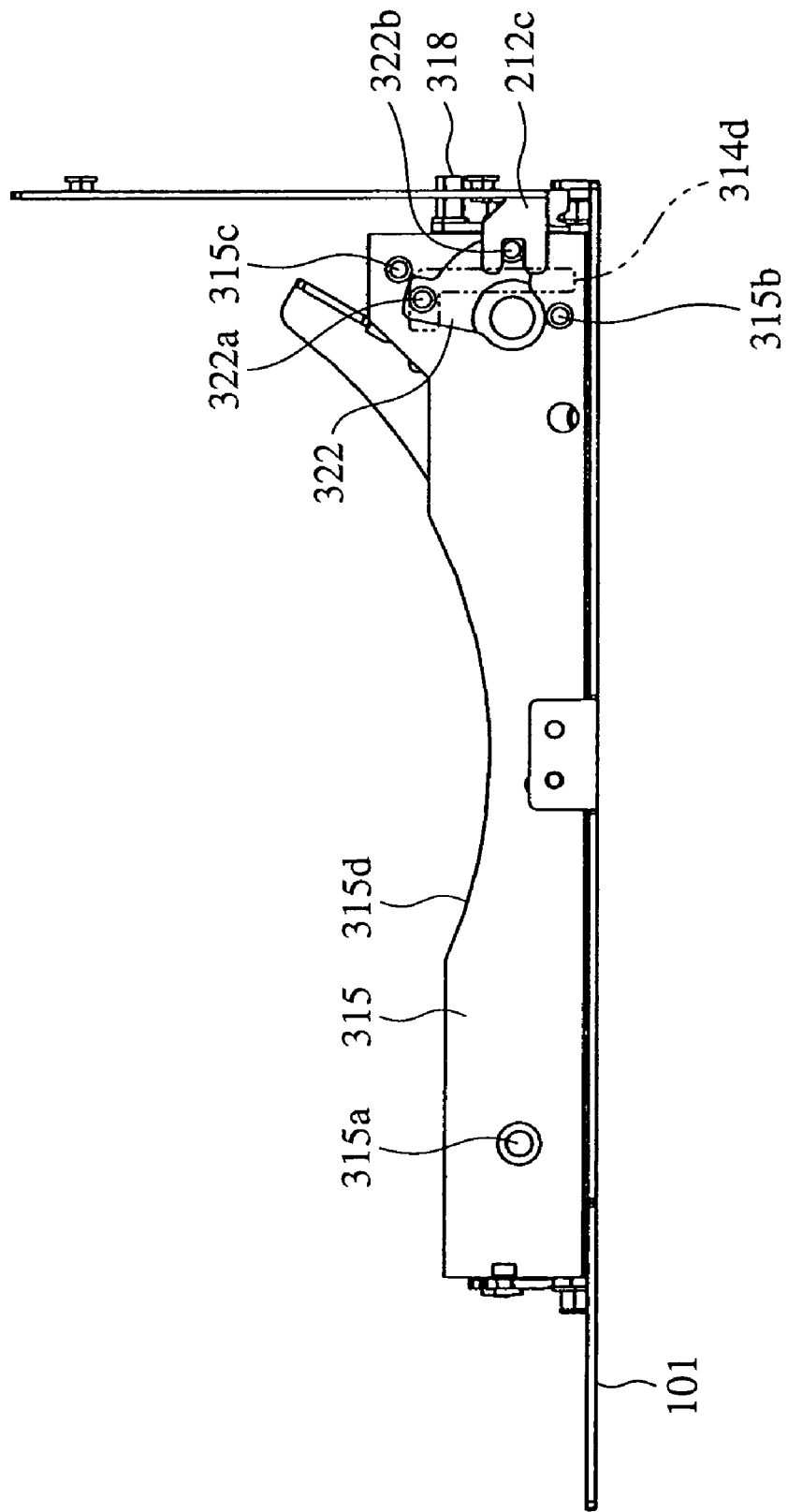
FIG. 10 is a plan view showing the state of FIG. 9.
Figure 11:
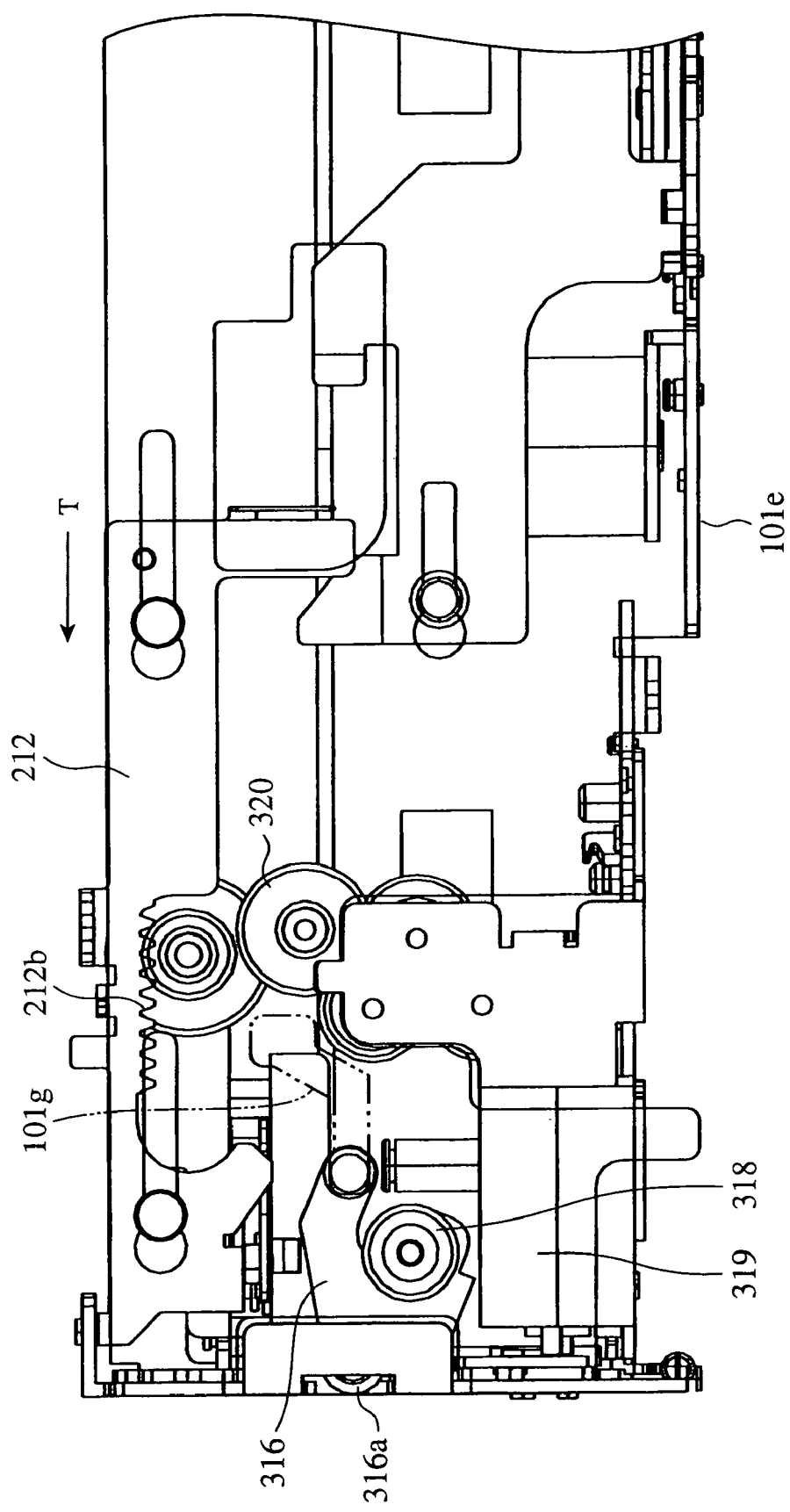
FIG. 11 is a side view of FIG. 10.

FIG. 1 is a perspective diagram showing a disk apparatus in accordance with the present invention in which a disk conveying mechanism is shown in spaced apart relation to a housing, FIG. 2 is a perspective diagram showing the disk apparatus in accordance with the present invention in which the disk conveying mechanism is mounted in the housing, FIG. 3 is a perspective diagram showing the disk conveying mechanism, FIG. 4 is a perspective diagram showing the disk conveying mechanism when viewed from a direction different to that of FIG. 3, FIG. 5 is a plan view showing the disk conveying mechanism when conveying a disk, FIG. 6 is a side view of FIG. 5, FIG. 7 is a plan view of the disk conveying mechanism which is placed in a state in which locking of the disk conveying mechanism is released, FIG. 8 is a side view of FIG. 8, FIG. 9 is a perspective diagram showing a state in which the disk conveying mechanism is retracted to outside an area in which disks can be handled by the disk conveying mechanism, FIG. 10 is a plan view showing the state of FIG. 9, and FIG. 11 is a side view of FIG. 10.

As shown in FIGS. 1 and 2, the housing 101 consists of a front side plate 101a, a right-hand side plate 101b, a left-hand side plate 101d, a rear side plate (not shown in the figures), and a bottom plate 101e. The housing 101 also includes a top plate (not shown in the figures) attached to an upper surface thereof. The disk conveying mechanism has a base plate 314 that is disposed above a disk insertion/ejection opening 303 formed in the front side plate 110a of the housing and that is projecting from an inner surface of the front side plate 101a of the housing to the interior of the housing, and a plurality of straight line-shaped guide grooves 314a to 314c and an L-shaped guide groove 314d are formed in both end portions of the base plate 314. A disk guide plate 315 is disposed under the base plate 314, and a plurality of pins 315a to 315c formed on an upper surface of the disk guide plate 315 are made to pass through the plurality of guide grooves 314a to 314c, respectively, and have top ends which are shaped like a flange so that they cannot be disconnected from the plurality of guide grooves 314a to 314c, respectively. Thereby, the disk guide plate 315 is hung and supported by the base plate 314. An arc-shaped dented portion 315d for preventing interference with the disk is disposed in a central part of the disk guide plate 315.

As shown in FIG. 3, rotary levers 316 are respectively attached to bent portions 315e disposed at both ends of the disk guide plate 315 via an axis 316a, and a disk conveying roller 317 is disposed between the rotary levers 316. The disk guide plate 315 and the disk conveying roller 317 are arranged so that a gap between them is positioned at much the same level as the disk insertion/ejection opening 303. A power transfer gear 318 is disposed on an axis 317a of the disk conveying roller 317 projecting outside from one of the rotary levers 316. The power transfer gear 318 is engaged with a gear series 320 for transmitting a rotary force from a motor 319 of FIG. 4 which is mounted to the inner surface of the front side plate 101a of the housing. A guide pin 321 is disposed in an end portion of each of the rotary levers 316 which is located on an inner side of the housing. The guide pin 321 is engaged with a cam groove 101g formed in the right-hand side plate 101b of the housing, as shown in FIG. 2.

As shown in FIG. 5, a locking lever 322 is rotatably supported on an upper surface of the disk guide plate 315 in the vicinity of the gear 318, and a pin 322a disposed on this locking lever 322 is engaged with the L-shaped guide groove 314d formed in the base plate 314. In addition, a forked engaging member 212c of a sliding plate 212 shown in FIG. 1, which can move along an inner surface of the right-hand side plate 101b of the housing, is engaged with another pin 322b disposed on the locking lever 322, and a rack member 212b formed in the sliding plate 212 is engaged with one gear of the gear series 320 shown in FIG. 4. The sliding plate 212 is an actuation mechanism which is one of structural members which control the operation of the disk apparatus.

Next, the operation of the disk apparatus in accordance with this embodiment of the present invention will be explained.

When the disk apparatus stops operating, the structural members of each mechanism return to their initial positions. Therefore, the disk conveying plate 315 projects toward the interior of the housing, and the locking lever 322 disposed on the disk conveying plate 315 holds the projection state in which the disk conveying plate 315 projects toward the interior of the housing with the pin 322a being engaged with a locking portion of the L-shaped guide groove 314d of the base plate 314. When a disk 450 is inserted into the housing 101 via the disk insertion/ejection opening 303 in this state, the motor 319 disposed under the disk guide plate 315 operates in response to a sensor signal from a sensor (not shown in the figures) that has detected the inserted disk, and the disk conveying roller 317 then operates via the gear series 320 and conveys the disk 450 to a conveyance completion position at which the conveyance of the disk is completed.

When the sliding plate 212 is made to move in a direction of an arrow T of FIG. 3 by virtue of a mechanism (not shown) that is operated in response to the detection signal from the sensor (not shown) that has detected that the disk 450 has been conveyed to the conveyance completion position, the rack member 212b of the sliding plate 212 is engaged with one gear of the gear series 320, and the sliding plate 212 receives the driving force from the gear series and continues to further move in the direction of the arrow T. This movement results in engagement between the pin 322b disposed on the locking lever 322 arranged on the upper surface of the disk conveying plate 315 and the forked engaging member 212c of the slide plate 212, and the locking lever 322 rotates from a state shown in FIGS. 2 to 6 to a state shown in FIGS. 7 and 8 and the pin 322a moves from the locking portion of the L-shaped guide groove 314d of the base plate 314 and goes into a straight line portion of the L-shaped guide groove 314d. As a result, the disk conveying plate 315 retracts (or moves backward) in the direction of the arrow T, i.e., toward the disk insertion/ejection opening 303 and enters a state shown in FIGS. 9 to 11 as the sliding plate 212 moves in the direction of the arrow T. This backward movement can prevent the disk conveying plate 315 from interfering with the disk located at the conveyance completion position.

As mentioned above, since the disk apparatus in accordance with this embodiment 1 is so constructed as to, when conveying a disk to the interior of the disk apparatus, lock the disk conveying plate 315 projecting toward the interior of the housing at its locking position, it is possible to certainly prevent the disk conveying plate 315 from moving backward for some reason when conveying the disk and hence to prevent the conveyance of the disk from becoming an impossibility. In addition, since the disk apparatus is so constructed as to, when playing back a disk, as to release the locking of the locking lever 322 of the disk conveying plate 315 using the movement of the sliding plate 212 which retracts the disk conveying plate 315, the disk apparatus can certainly retract the disk conveying plate 315 to outside the area in which disks can be handled by the disk conveying mechanism so as to prevent the disk conveying plate 315 from interfering with the operation of playing back the disk.

Thus, in accordance with the present invention, the operation of moving the disk conveying plate 315 and the operation of locking or releasing the locking of the locking lever 322 are performed using the existing sliding plate 212 disposed for retracting the disk conveying plate 315 to outside the area in which disks can be handled by the disk conveying mechanism. In other words, the operation of moving the disk conveying plate 315 and the operation of locking or releasing the locking of the locking lever 322 can be unified with the simple structure. Therefore, the reliability of the disk apparatus can be further improved.

Figure 12:
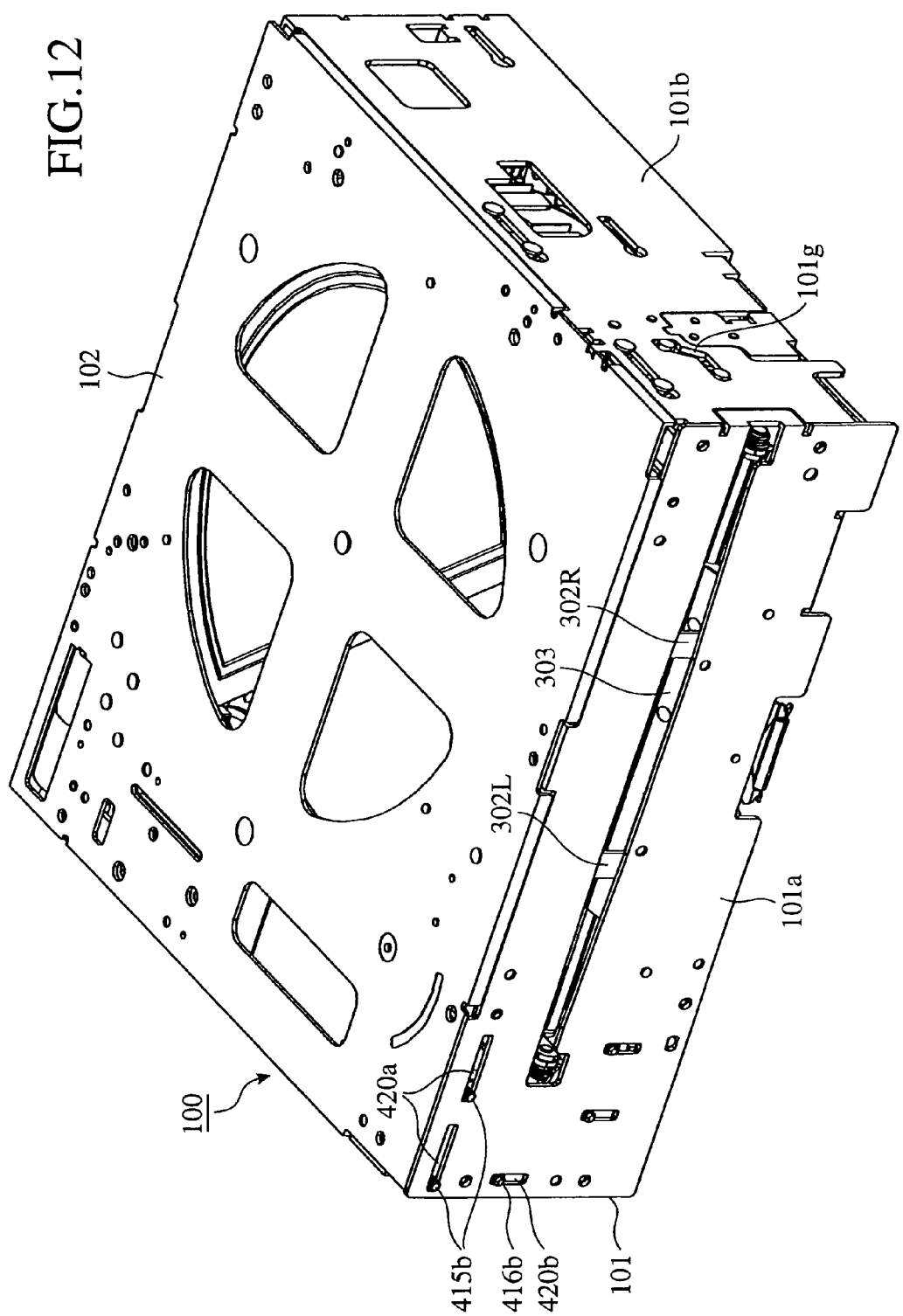
FIG. 12 is a perspective diagram showing the outward appearance of a main part of the disk apparatus.
Figure 13:
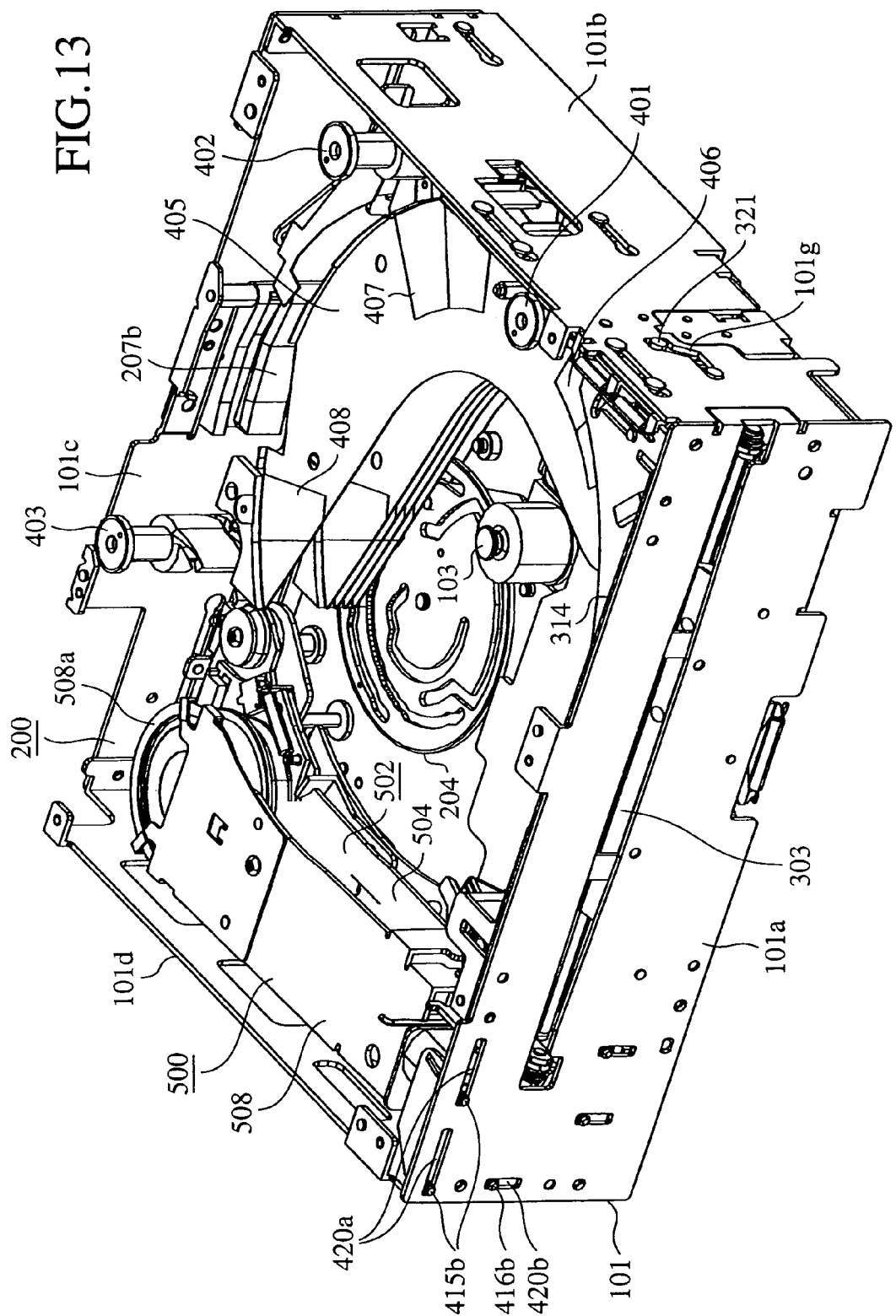
FIG. 13 is a perspective diagram showing the interior of the disk apparatus, but in which a top plate is removed from a housing of the disk apparatus.
Figure 14:
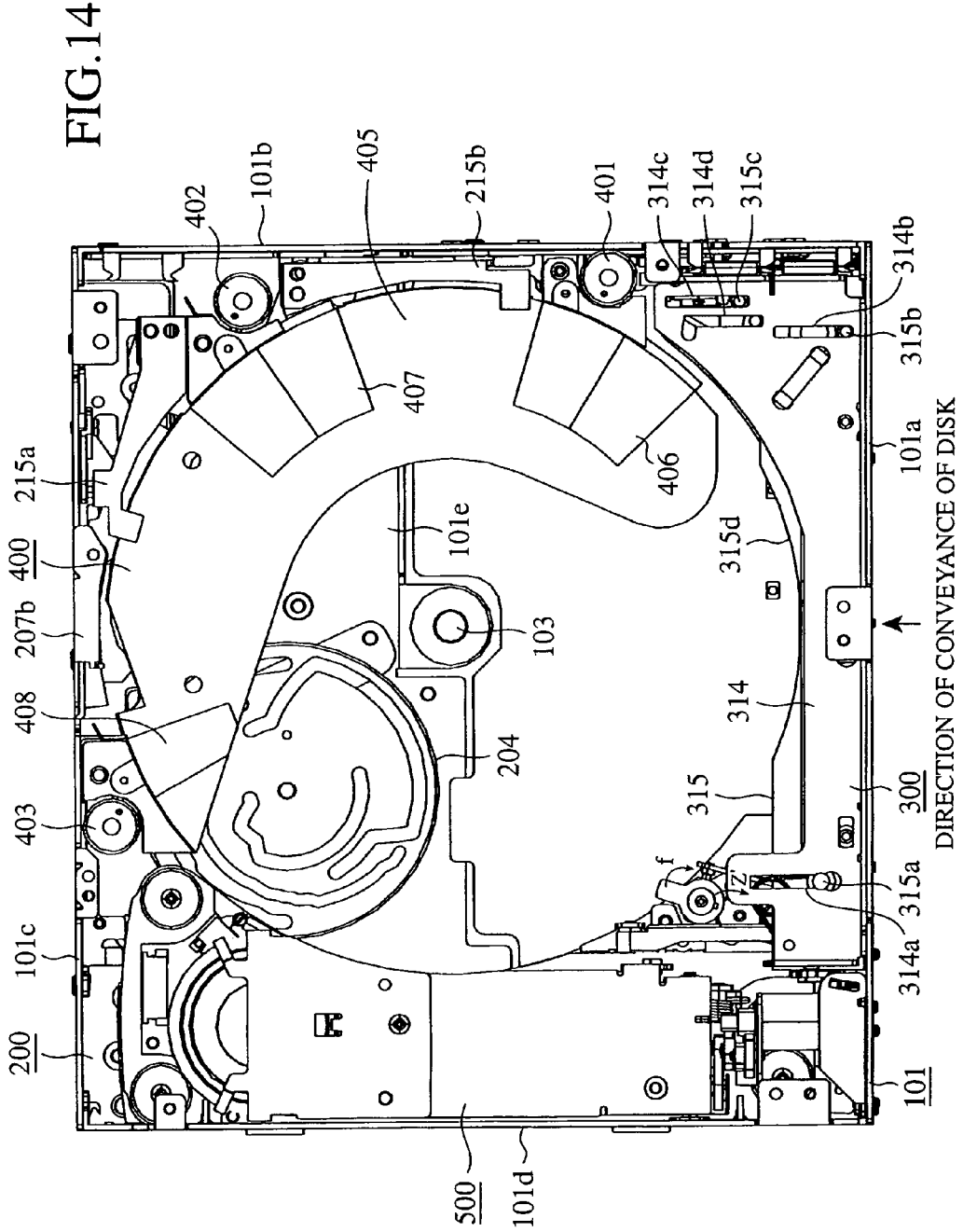
FIG. 14 is a plan view of FIG. 13.
Figure 15:
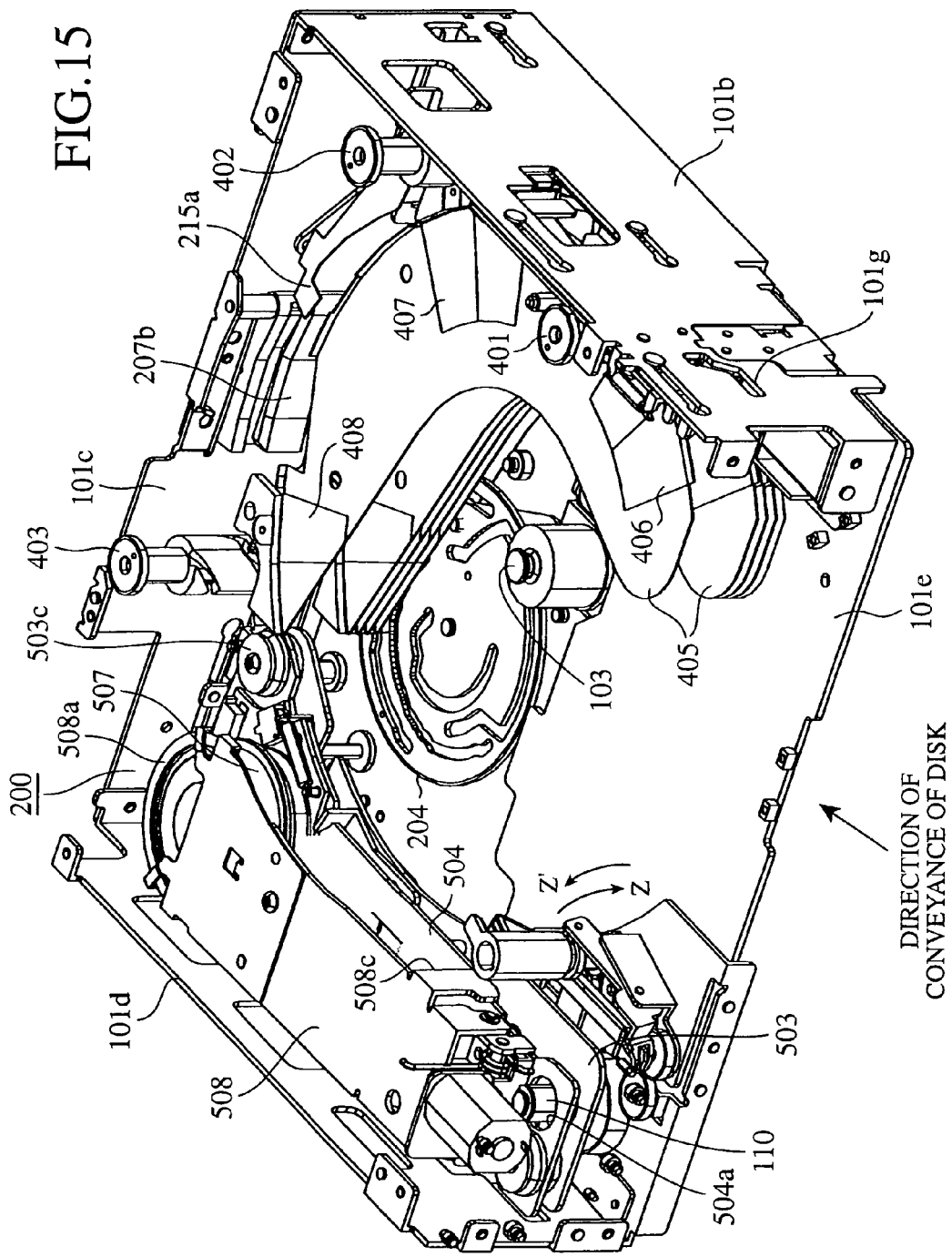
FIG. 15 is a perspective diagram showing the disk apparatus, but in which a front side plate of the housing is removed.

Hereafter, an example of the disk apparatus in accordance with the present invention will be explained with reference to drawings. FIG. 12 is a perspective diagram showing the outward appearance of a main part 100 of the disk apparatus, FIG. 13 is a perspective diagram showing the interior of the main part, but in which a top plate 102 is removed from the housing 101, FIG. 14 is a plan view of FIG. 13, and FIG. 15 is a perspective diagram of the disk apparatus, but showing a state in which the front side plate 101a of the housing 101 is removed.

As shown in these figures, a drive mechanism 200, a disk insertion/ejection mechanism 300, a disk changer mechanism 400, a playback unit 500, a number of cams, levers, etc. for making them work in cooperation with one another are disposed in the interior of the housing 101. Hereafter, those components will be explained with reference to FIGS. 1 to 40.

Figure 17:
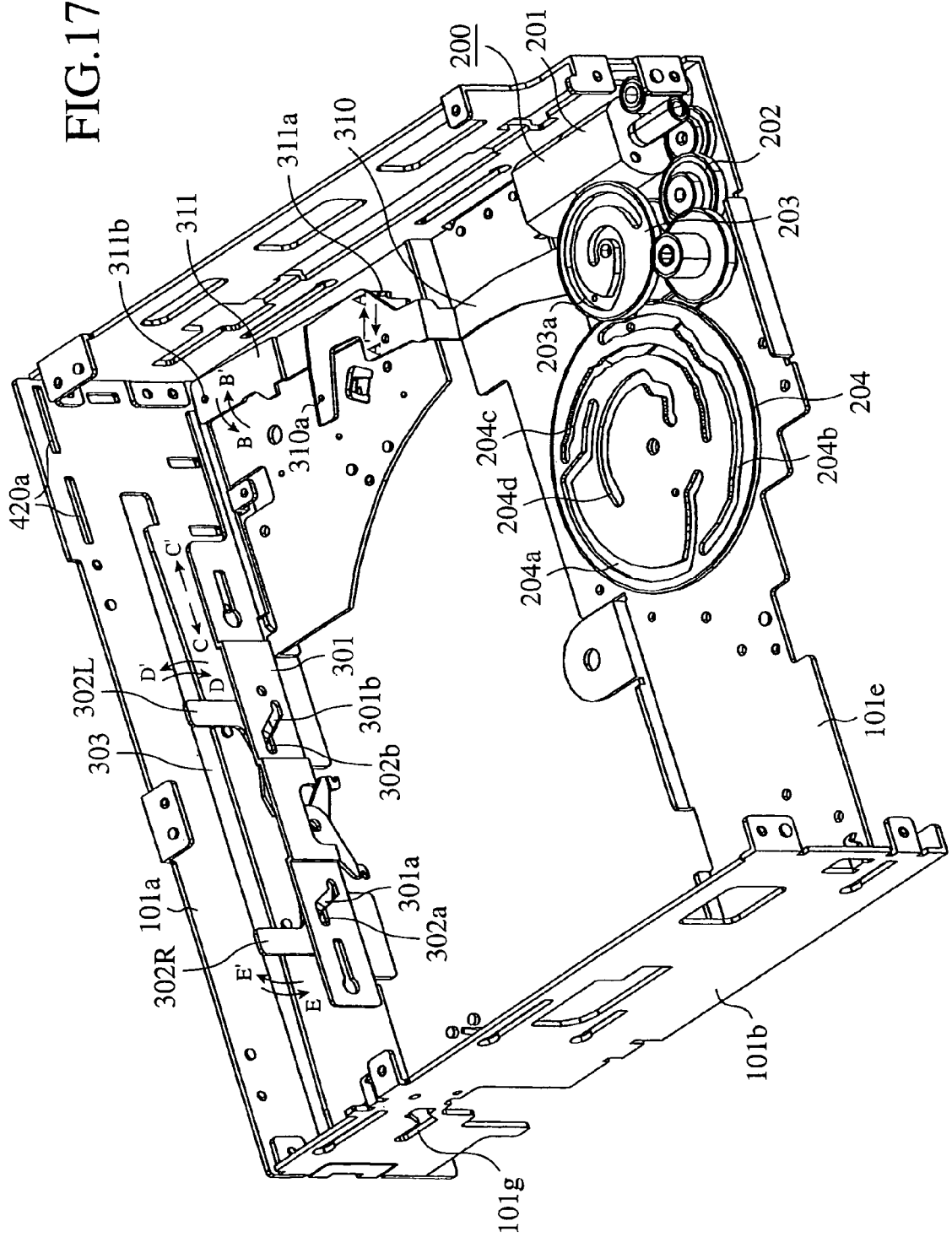
FIG. 17 is a perspective diagram of the disk apparatus when viewed from a right-hand rear side thereof.

Drive Mechanism 200:

As shown in FIG. 17, the drive mechanism 200 has a motor 201, as a driving source, disposed at a back corner of a bottom plate 101e of the housing 101, a first rotary member 203 and a second member 204 to which a driving force from the motor 201 is supplied via a gear series 202. A spiral cam groove 203a is formed in the first rotary member 203, and four independent cam grooves 204a, 204b, 204c, and 204d are formed in the second rotary member 204. The gear series 202, and the first and second rotary members 203 and 204 are rotatably supported on the bottom plate 101e of the housing 101.

Figure 39:
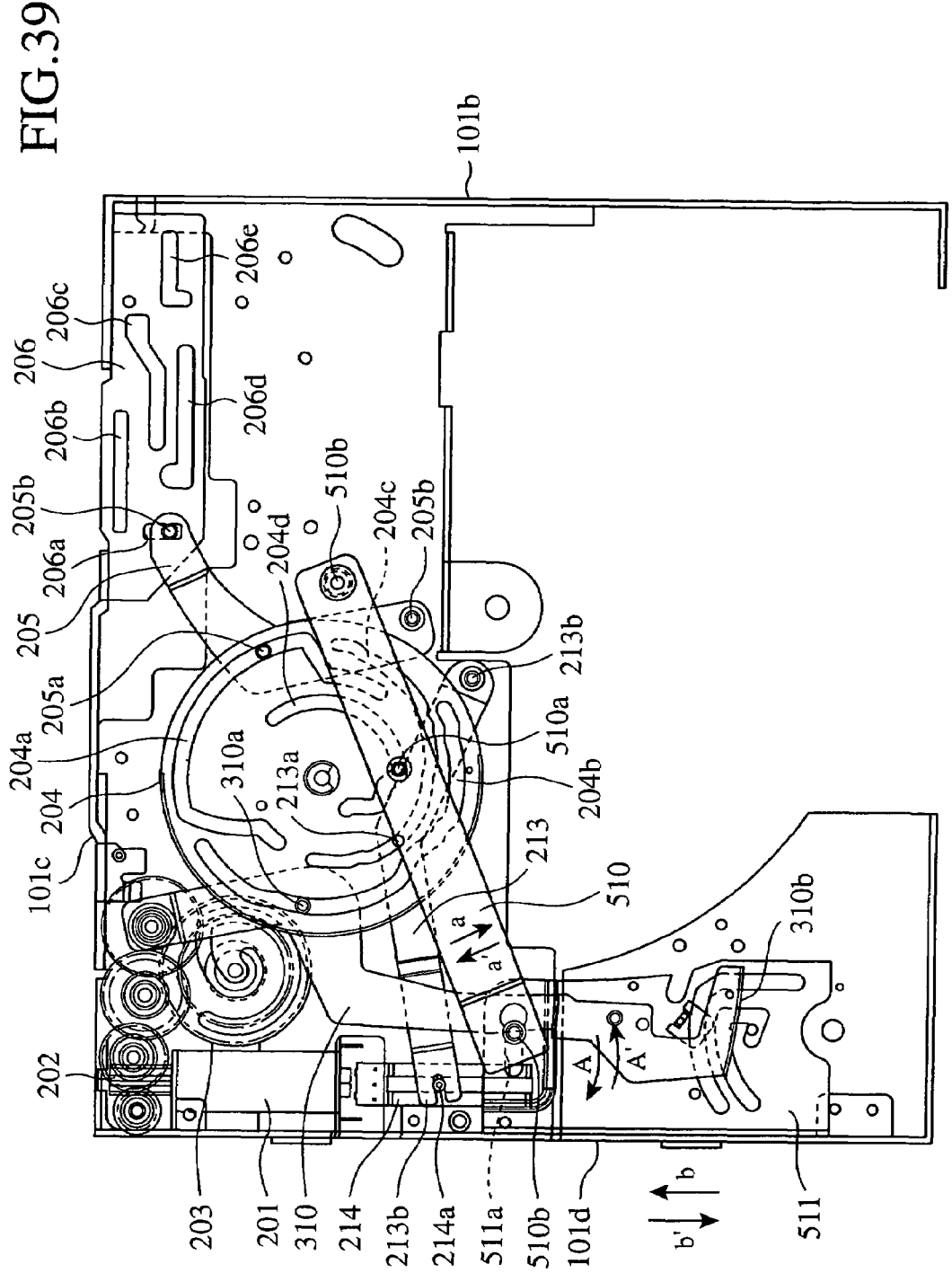
FIG. 39 is a plan view showing a relationship between a cam groove of a second rotary member and a lever engaged with the cam groove.

The cam groove 204a has a middle portion and both end portions which are arc-shaped and concentrically formed in the second rotary member 204, and connecting portions for connecting the middle portion with the both end portions, which are running in a direction of the radius of the second rotary member 204, as shown in FIG. 17. As shown in FIG. 39, a pin 205a disposed at a middle portion of an L-shaped first mechanical driving lever (referred to as a first driving lever from here on) 205, which is disposed under the second rotary member 204, is engaged with the cam groove 204a, and the first driving lever 205 has an end which is rotatably supported by an axis 205b disposed on the bottom plate 101e of the housing 101.

The cam groove 204b has a semicircle arc portion which is formed so that it has much the same radius as the cam groove 204a and is opposite to the cam groove 204a, as shown in FIG. 17. As shown in FIG. 39, a pin 310a disposed at a middle portion of a second mechanical driving lever (referred to as a second driving lever from here on) 310, which is disposed, as a shutter driving lever, under the second rotary member 204, is engaged with the cam groove 204b, and the second driving lever 310 has an end which is rotatably supported by the axis of one gear of the gear series 202.

The cam groove 204c is formed like a semicircle arc so that an end thereof is located in the vicinity of the outer edge of the second rotary member 204 and another end thereof is located in the vicinity of the center of the second rotary member 204, as shown in FIG. 17. As shown in FIG. 39, a pin 213a disposed at a middle portion of a sensor driving lever 213 disposed under the second rotary member 204 is engaged with the cam groove 204c, and the sensor driving lever 213 has an end which is rotatably supported by an axis 213c disposed on the bottom plate 101e of the housing 101.

The cam groove 204d is formed like a semicircle arc having a center on the axis of the second rotary member 204, and is bent at a midpoint thereof so that an end thereof approaches the axis of the second rotary member, as shown in FIG. 17. As shown in FIG. 39, a pin 510a disposed at a middle portion of a third mechanical driving lever (referred to as a third driving lever from here on) 510 disposed above the second rotary member 204 is engaged with the above-mentioned cam groove 204d, and the third driving lever 510 has an end which is rotatably supported by an axis 510b disposed on the bottom plate 101e of the housing 101.

Figure 23:
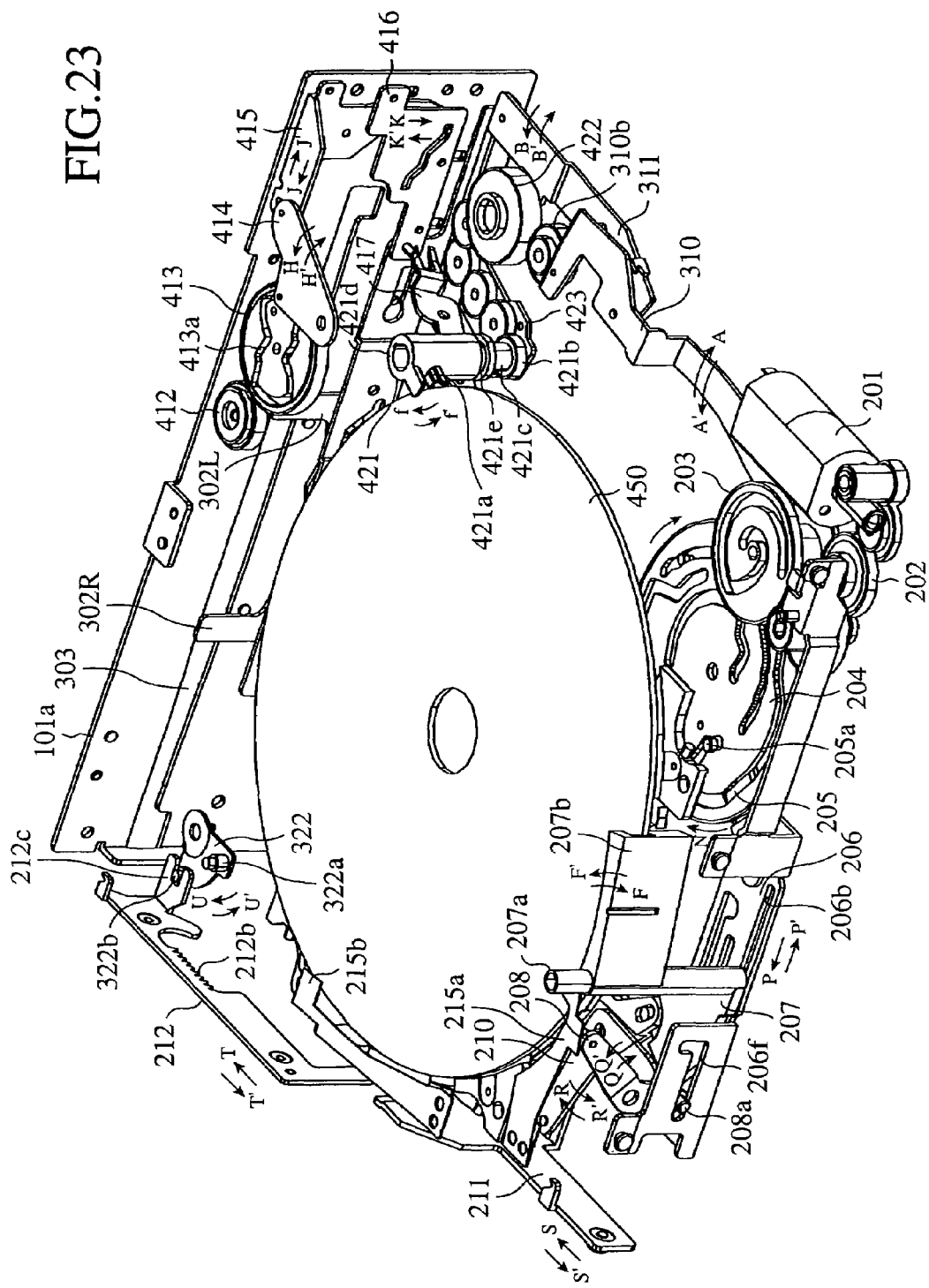
FIG. 23 is a perspective diagram of the disk apparatus when viewed from a left-hand rear side thereof.
Figure 24:
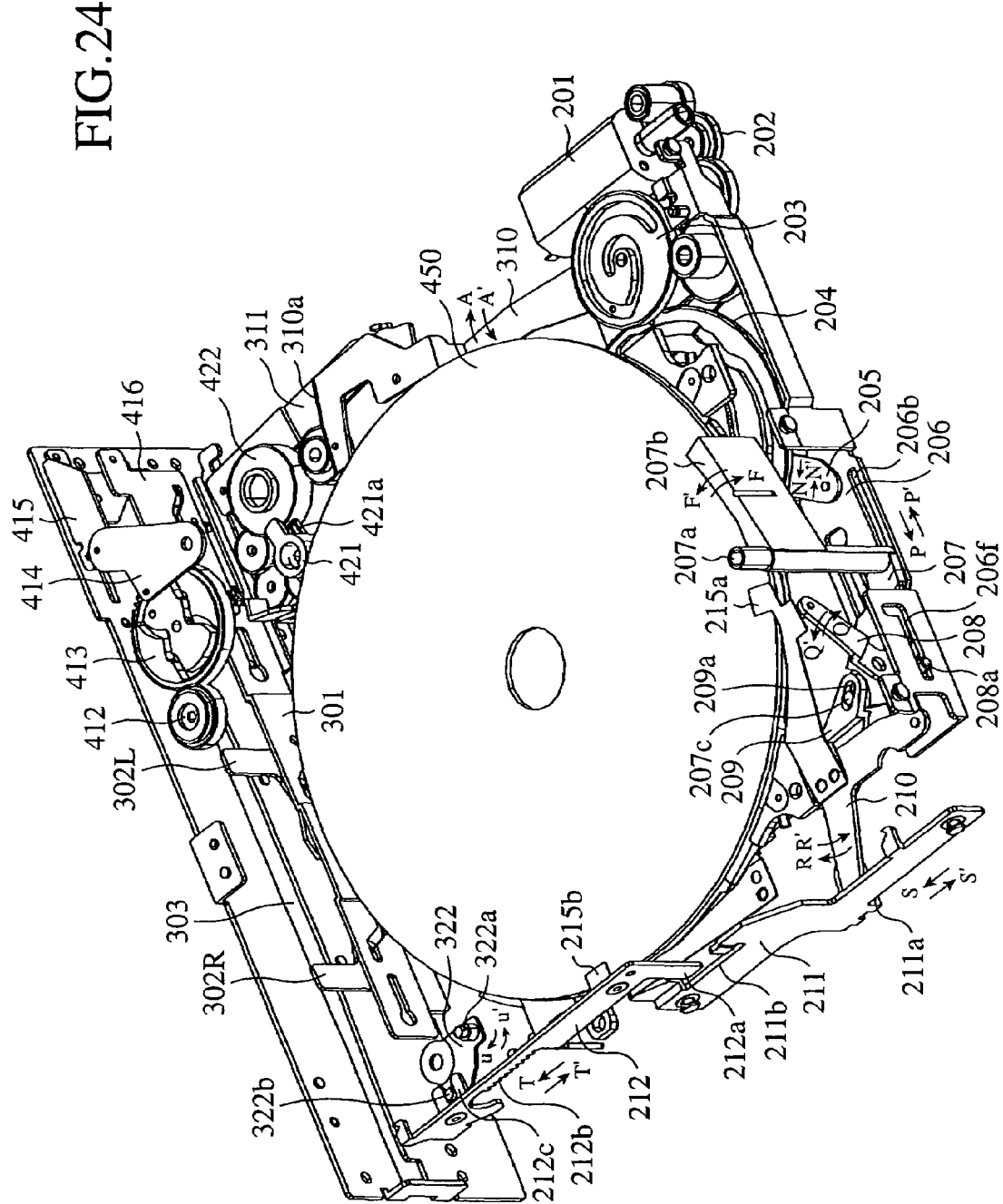
FIG. 24 is a perspective diagram of the disk apparatus when viewed from a right-hand rear side thereof.

The pin 205b disposed on the free end of the first driving lever 205 is engaged with a long hole 206a of the sliding plate 206 which moves in parallel with a rear side plate 101c of the housing 101 and four cam grooves 206b, 206c, 206d, and 206e are formed in the sliding plate 206, as shown in FIG. 39, and an L-shaped cam groove 206f is formed in a rising surface of the sliding plate 206 which is bent at a right angle with respect to the bottom portion in which the four cam grooves 206b, 206c, 206d, and 206e are formed, as shown in FIG. 23. As shown in FIG. 24, a rotary lever 207 has a cylinder 207a which is engaged with the cam groove 206b, and a disk detection plate 207b disposed at an upper portion of the cylinder 207a.

Figure 25:
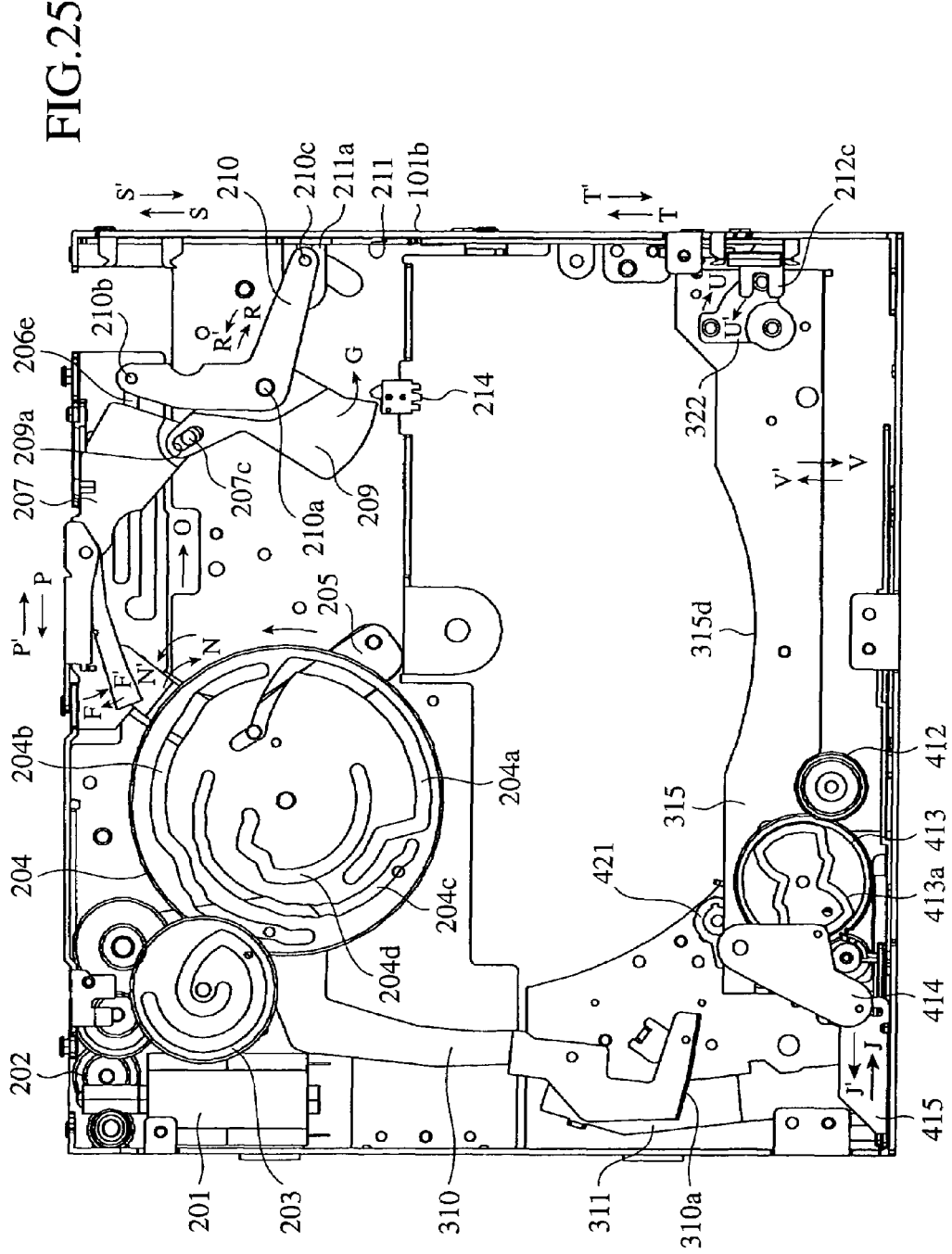
FIG. 25 is a plan view showing the interior of the housing, but in which the top plate is removed.

Referring to FIG. 24, a lever 208 having a pin 208a which is engaged with the L-shaped cam groove 206f is rotatably supported by the rear side plate 110c of the housing 101, and a lever 209 is connected with an end of the lever 207 by way of a pin 207c disposed on the lever 207 and a long hole 209a formed in the level 209. As shown in FIG. 25, an L-shaped lever 210 has a middle portion connected with the lever 209 via a rotation axis 210a, a pin 210b disposed at an end thereof and engaged with the cam groove 206e, and another pin 210c disposed at another end thereof and engaged with a bent forked portion 211a of a sliding plate 211.

The sliding plate 211 is so formed as to slide along the inner surface of the right-hand side plate of the housing 101, and, as shown in FIG. 24, the sliding plate 212 having an engaging portion 212a which is engaged with an upper dented edge portion 211b of the sliding plate 211 is so disposed as to slide along the inner surface of the right-hand side plate of the housing 101. The sliding plate 212 has the rack member 212b and the forked engaging member 212c which is bent at a right angle toward the interior of the housing, as previously mentioned.

Disk Insertion/Ejection Mechanism 300:

As shown in FIG. 17, the disk insertion/ejection mechanism 300 is provided with a cam plate 301 which moves rightward or leftward along the inner surface of the front side plate 101a of the housing, and two cam grooves 301a and 301b are formed in right and left portions of the cam plate 301, respectively. Two shutters 302R and 302L have pins 302a and 302b which are engaged with the cam grooves 301a and 301b of the cam plate 301, respectively, and are rotatably supported by the inner surface of the front side plate 110a of the housing so that the disk insertion/ejection opening 303 formed in the housing front side plate 101a can be opened or closed.

As shown in FIGS. 1 and 2, the base plate 314 projecting from the inner surface of the front side plate 101a of the housing to the interior of the housing is formed above the disk insertion/ejection opening 303, and the straight line-shaped guide grooves 314a to 314c and the L-shaped guide groove 314d are formed in the both end portions of the base plate 314. The disk conveying plate 315 is disposed below the base plate 314, and the pins 315a to 315c disposed on the upper surface of the disk conveying plate 315 are passed through the guide grooves 314a to 314c, respectively, and the top ends of the pins 315a to 315c are swaged so that they cannot be disconnected from the plurality of guide grooves 314a to 314c, respectively. Thereby, the disk guide plate 315 is hung and supported by the base plate 314. The dented portion 315d is formed like an arc at a central part of the disk conveying plate 315 so that the rim of an inserted disk cannot be in contact with the disk conveying plate 315.

Figure 20:
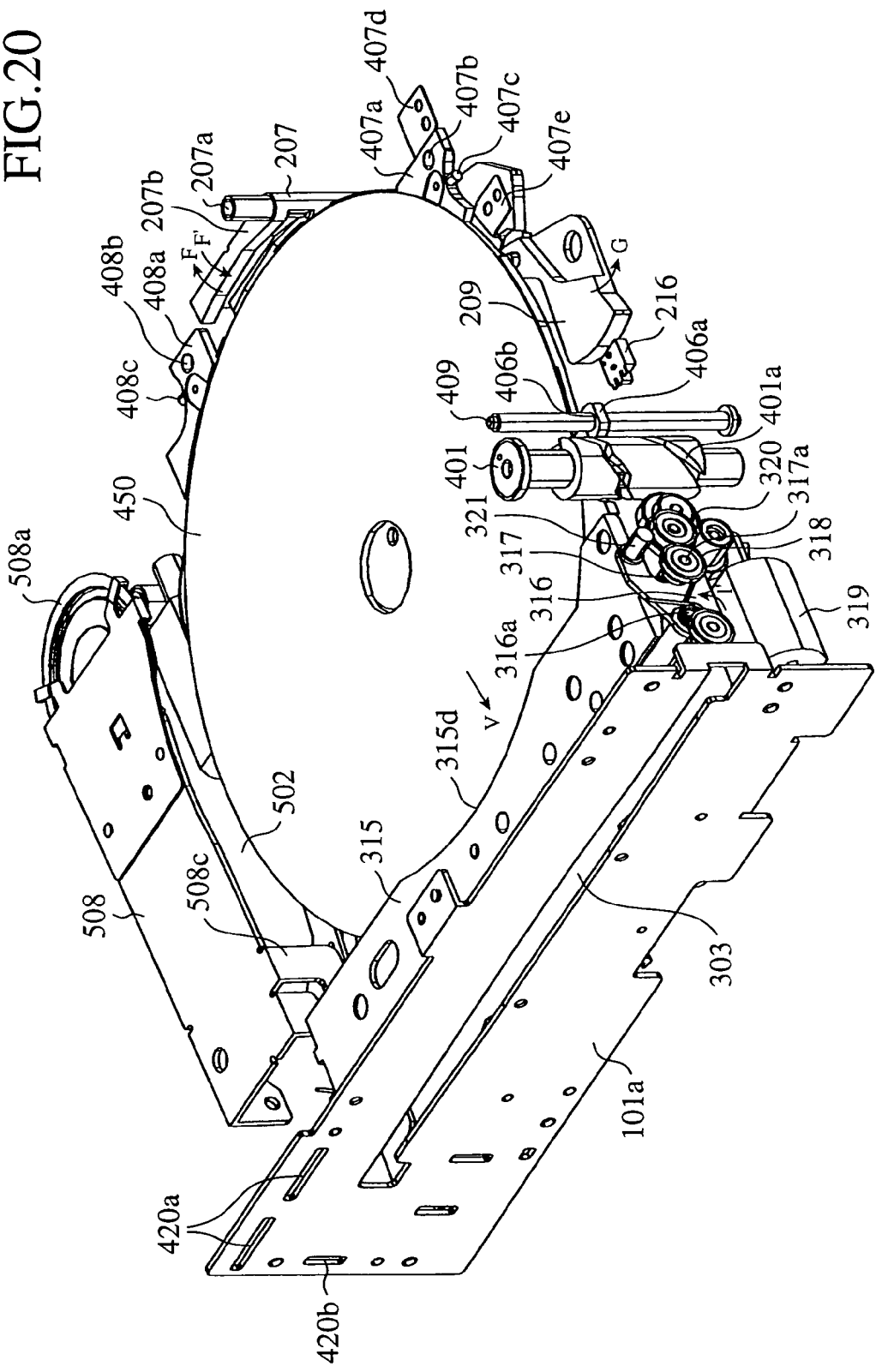
FIG. 20 is a perspective diagram of the disk apparatus when viewed from a right-hand front side thereof.

As shown in FIGS. 1 to 4, the rotary levers 316 are attached to the both ends of the disk conveying plate 315 via the axis 316a, and the disk conveying roller 317 is disposed in parallel with the axis 316a between the rotary levers 316. The disk guide plate 315 and the disk conveying roller 317 are arranged so that the gap between them is positioned at much the same level as the disk insertion/ejection opening 303. The power transfer gear 318 is attached to the axis 317a of the disk conveying roller 317 projecting outside from one of the rotary levers 316, and the gear series 320 for transmitting a rotary force from a motor 319, as shown in FIG. 20, which is mounted to the inner surface of the right-hand side plate 101b of the housing, is engaged with the gear 318. The guide pin 321, as well as the gear 318, is disposed on the rotary lever 316, and the guide pin 321 is engaged with the cam groove 101g formed in the right-hand side plate 101b of the housing.

The locking lever 322 is rotatably supported on a right-hand side portion of the upper surface of the disk conveying plate 315 to which the gear series 320 is mounted and the pin 322a disposed on the locking lever 322 is engaged with the L-shaped guide groove 314d of the base plate 314, as shown in FIGS. 1 and 2, and the forked engaging member 212c of the sliding plate 212 is engaged with the pin 322b disposed on the locking lever 322, as shown in FIG. 23. The rack member 212b formed in the sliding plate 212 is engaged with one gear of the gear series 320.

Figure 18:
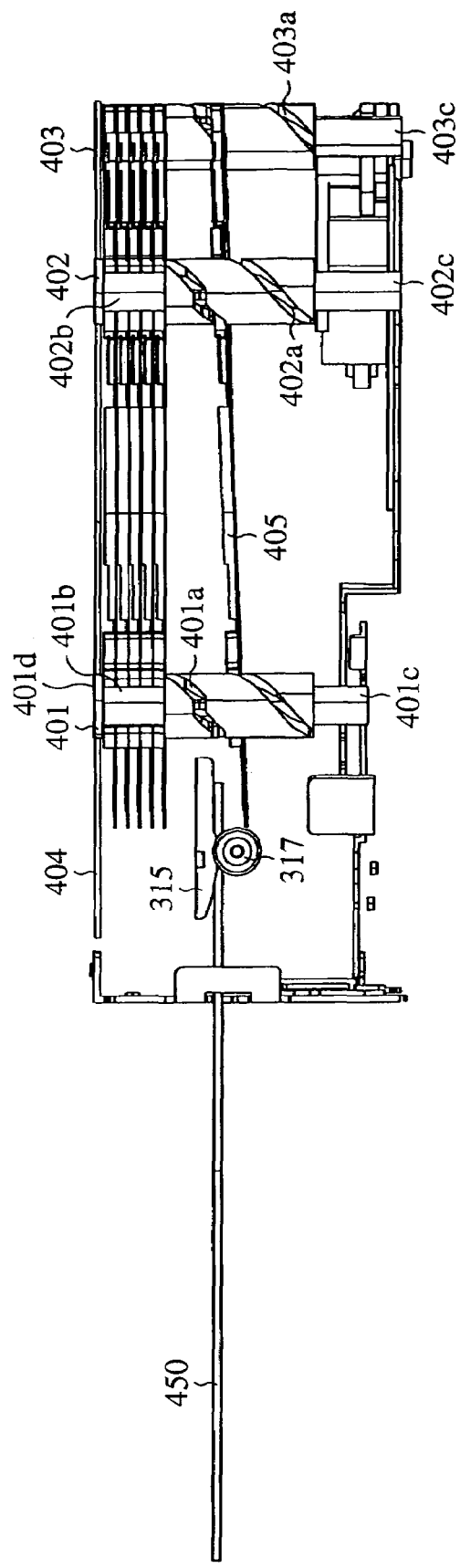
FIG. 18 is a side view showing a right-hand side of the disk apparatus, but in which a right-hand side plate is removed.
Figure 19:
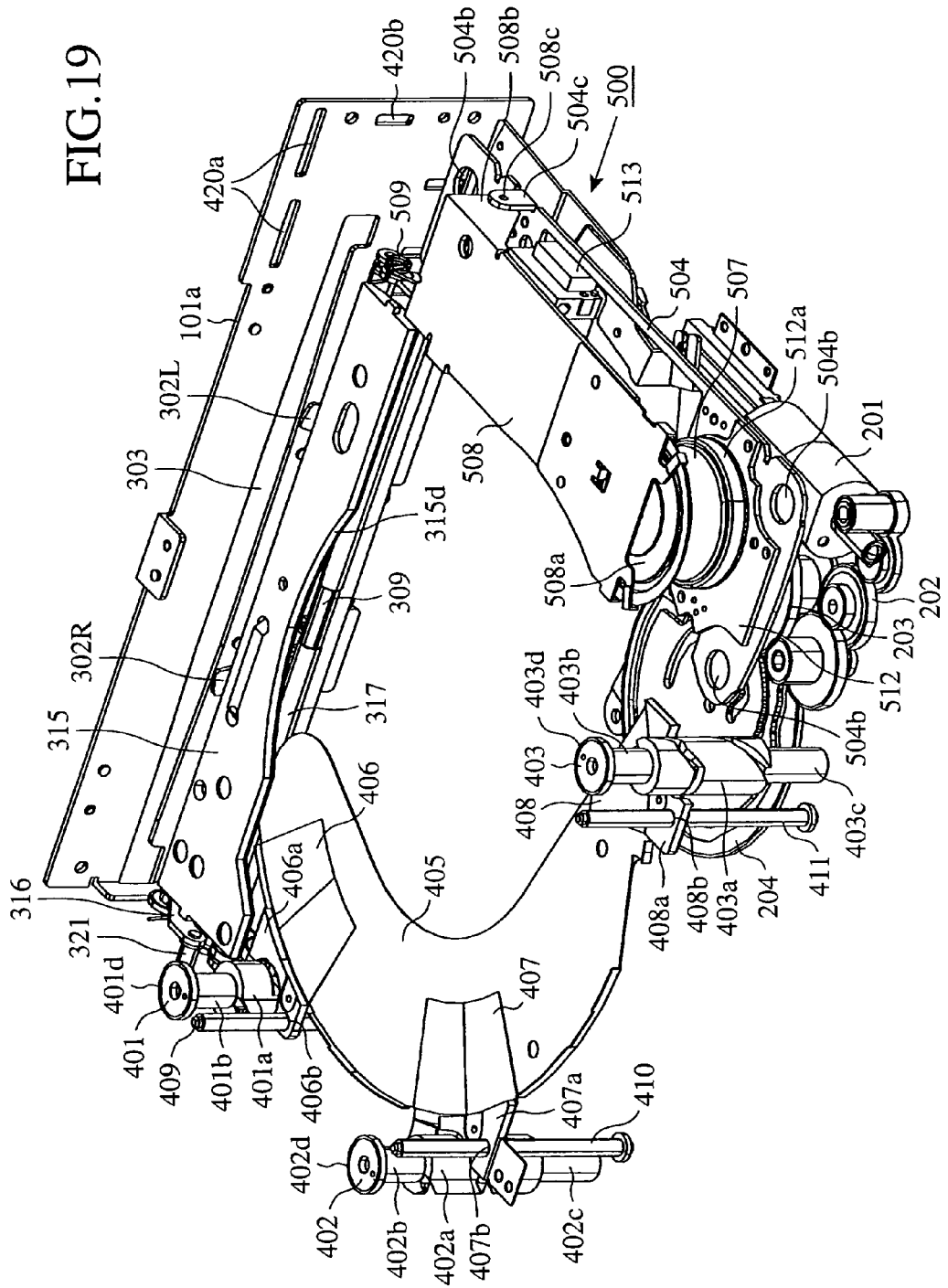
FIG. 19 is a perspective diagram of the disk apparatus when viewed from a left-hand-rear side thereof.

Disk Changer Mechanism 400:

In the disk changer mechanism 400, three disk upward/downward moving members (referred to as rotation axes from here on) 401, 402, and 403 are supported at positions having angles of about 0 degrees, 90 degrees, and 180 degrees with respect to a diagonal line connecting between a right end of the front side plate and a left end of the rear side plate, and between the bottom plate 110d and top plate 102 of the housing, as shown in FIGS. 18 and 19. Small-diameter portions 401b, 402b, and 403b having a height enough to accommodate a predetermined number of disks 450 (for example, five disks) are formed in upper parts of the rotation axes 401, 402, and 403, respectively, and small-diameter portions 401c, 402c, and 403c are also formed in lower parts of the rotation axes, respectively. Step-wise spiral grooves 401a, 402a, and 403a are formed in the outer surfaces of large-diameter middle portions of the rotation axes, respectively.

Figure 40:
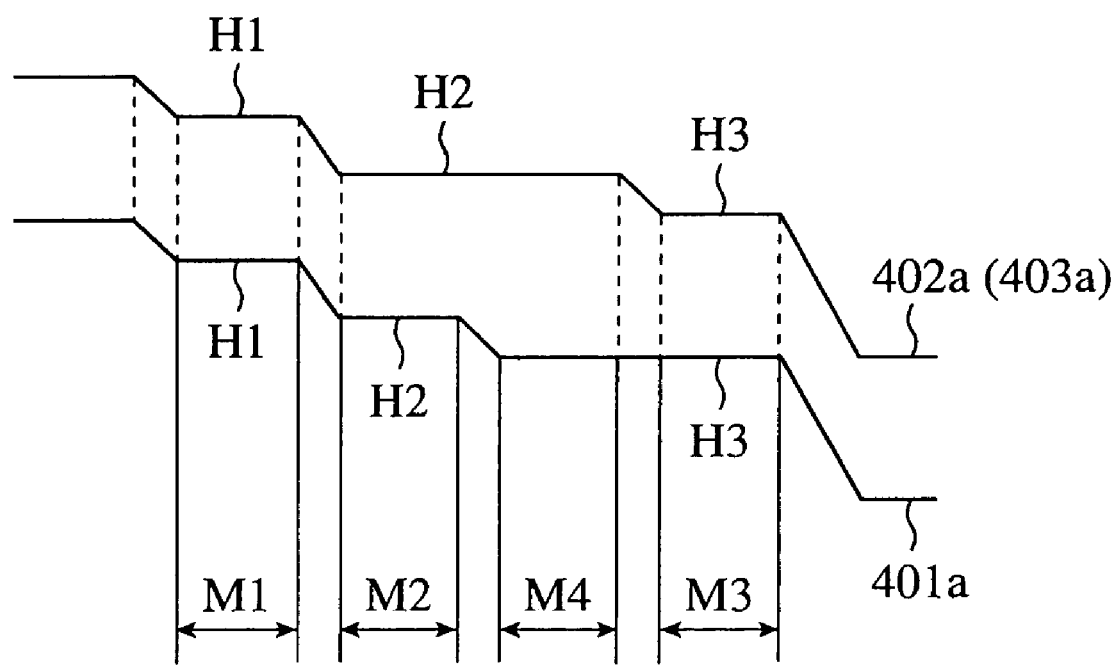
FIG. 40 is an expansion plan of spiral grooves for moving a stocker upward or downward.

While the step-wise spiral grooves 402a and 403a formed in the outer surfaces of the large-diameter middle portions of the two-rotation axes 402 and 403 located on the back side of the housing have an identical shape, the step-wise spiral groove 401a of the rotation axis 401 located on the front side of the housing switches from a step H2 to another step H3 at an earlier time than those 402a and 403a formed in the rotation axes 402 and 403, as shown in FIG. 40. By virtue of this structure, the front side of the disk being held by the disk apparatus becomes lower than the back side of the disk at timing when the step-wise spiral groove 401a of the rotation axis 401 switches from the step H2 to the other step H3. The rotation axes 401, 402, and 403 have gears 401d, 402d, and 403d at the top ends thereof, respectively, and the gears 401d, 402d, and 403d are engaged with one large-diameter gear 404. In FIG. 40, H1 denotes a playback unit entry level (i.e., an elevation position where the disk supported by a stocker 405 and the disk guide member 421 is placed above the turntable 507 so that the disk does not interfere with movements of the turntable 507), H2 denotes a disk chugging level (i.e., an elevation position where the disk placed on the turntable 507 is pressed by the clamper 508a), and H3 denotes a playback unit retraction level (i.e., an elevation position where the disk supported by a stocker 405 and the disk guide member 421 is placed when the turntable 507 is retracted to beside the disk). Furthermore, M1 denotes a playback unit entry mode in which the turntable 507 is moved to a position where it supports the disk, M2 denotes a disk chugging mode in which the disk placed on the turntable 507 is pressed and held by the clamper 508a, M3 denotes a playback unit retraction mode in which the turntable 507 is retracted to beside the disk, and M4 denotes a disk insertion/ejection mode in which a disk is inserted into the disk apparatus or a disk is ejected from the disk apparatus.

Figure 16:
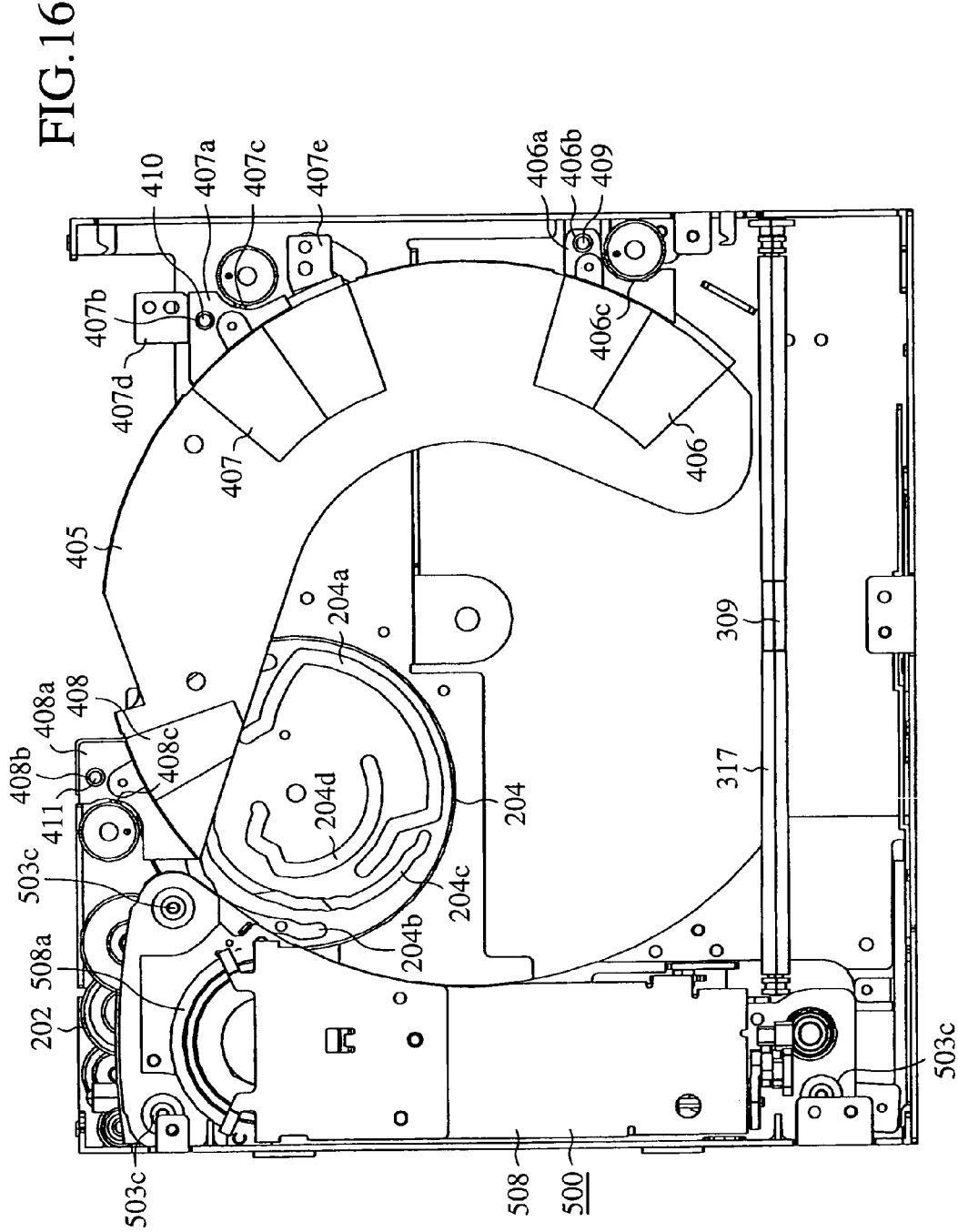
FIG. 16 is a plan view showing the interior of the housing, but in which the top plate is removed.

Each of a plurality of stockers 405 for supporting a disk 450 is constructed of an arc-shaped sheet material, which is shaped like a part of a circle whose more than half of its area including a center is removed. Each stocker 405 has supporting members 406, 407, and 408 which are attached to parts thereof having angles of about 0 degrees, 90 degrees, and 180 degrees with respect to the diagonal line connecting between the right end of the front side plate and the left end of the rear side plate, respectively. As shown in FIGS. 16 and 20, projecting portions 406a, 407a, and 408a which are projecting outwardly from the supporting members 406, 407, and 408, respectively, have holes 406b, 407b, and 408b through which guide pins 409, 410, and 411 installed in the vicinity of the rotation axes 401, 402, and 403 are passed, and pins 406c, 407c, and 408c which are engaged with the spiral grooves 401a, 402a, and 403a formed in the rotation axes 401, 402, and 403, respectively. Furthermore, attachment arms 407d and 407e to which stocker flat springs 215a and 215b are attached are disposed on the projecting member 407a.

By virtue of this structure, the large-diameter gear 404 rotates according to the driving force of the motor 418 by way of the gear series 419, and therefore the rotation axes 401, 402, and 403 simultaneously rotate by way of the gears 401d, 402d, and 403d, respectively. As a result, each stocker 405 can be made to move upward or downward along the spiral grooves 401a, 402a, and 403a. While each stocker 405 is moved upward or downward, the difference in level between the step-wise spiral grooves 402a and 403a of the rotation axes 402 and 403 located on the back side of the housing, and the step-wise spiral groove 401a of the rotation axis 401 located on the front side of the housing causes the front side of the disk 450 being held by each stocker 405 to point downward.

Figure 21:
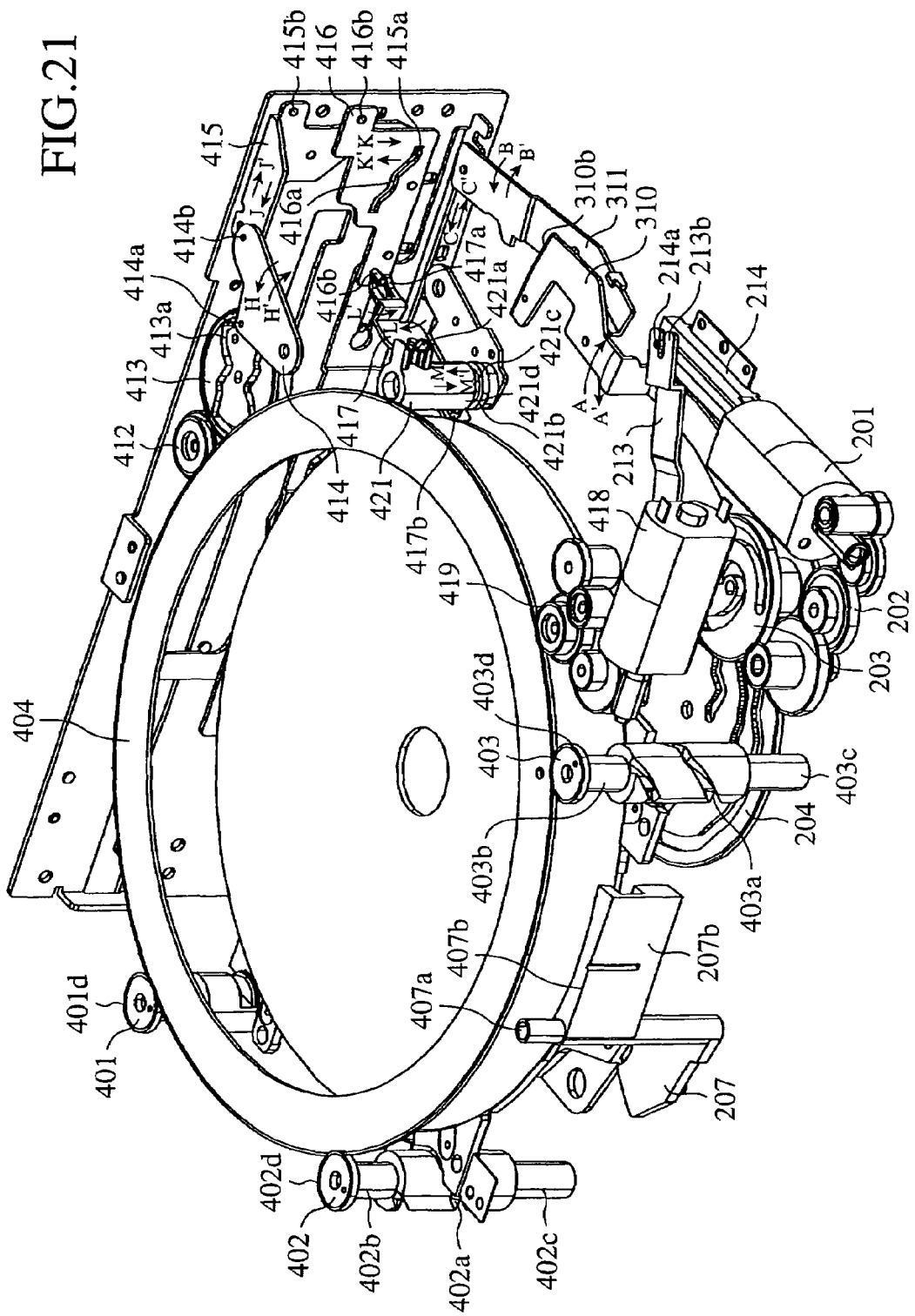
FIG. 21 is a perspective diagram of the disk apparatus when viewed from a left-hand rear side thereof.

As shown in FIG. 21, the disk changer mechanism 400 is further provided with a gear 412 which is disposed in the vicinity of the disk insertion/ejection opening 303 and is engaged with the large-diameter gear 404, a gear 413 which is engaged with the gear 412, a shaking lever 414 having a pin 414a which is engaged with an 8-shaped cam groove 413a formed in the gear 413, a sliding plate 415 which is connected with the shaking lever 414 via a pin 414b of the shaking lever 414, and which slides rightward or leftward along the front side plate 101a of the housing, a sliding plate 416 in which a cam groove 416a engaged with a pin 415a of the sliding plate 415 is formed, the sliding plate 416 sliding upward or downward along the front side plate 101a of the housing, and a rotary plate 417 having a forked portion 417a at an end thereof, which is engaged with a pin 416b of the sliding plate 416.

The gears 412 and 413 and the shaking lever 414 are supported by the top plate 102 of the housing, and pins 415b formed in left-hand and right-hand end portions of the sliding plate 415 are engaged with horizontal long holes 420a of the front side plate 101a of the housing, respectively, as shown in FIG. 13. Furthermore, a pin 416a disposed on the sliding plate 416 is engaged with a perpendicular long hole 420b formed in the front side plate 101a of the housing, as shown in FIG. 13.

Referring now to FIG. 23, a gear series 422 that connects a gear 310b disposed at an end of the second driving lever 310 with a gear 421b disposed under a disk guide member 421 is rotatably supported on a rotation axis supporting plate 423 which is disposed on the bottom surface 101e of the housing. The above-mentioned rotary plate 417 is rotatably supported on a perpendicular bent portion of the rotation axis supporting plate 423. In the above-mentioned disk guide member 421, an external cylinder 421d is slipped over an axial member 421c having the gear 421b, a sandwiching portion 421a for sandwiching the disk is disposed on an upper outer face portion of the external cylinder 421d, and a pin 417b which is protruded from the rotary plate 417 is engaged with a lower outer face portion of the external cylinder 421d. By virtue of this structure, the disk guide member 421 can be rotated and moved upward or downward.

Figure 28:
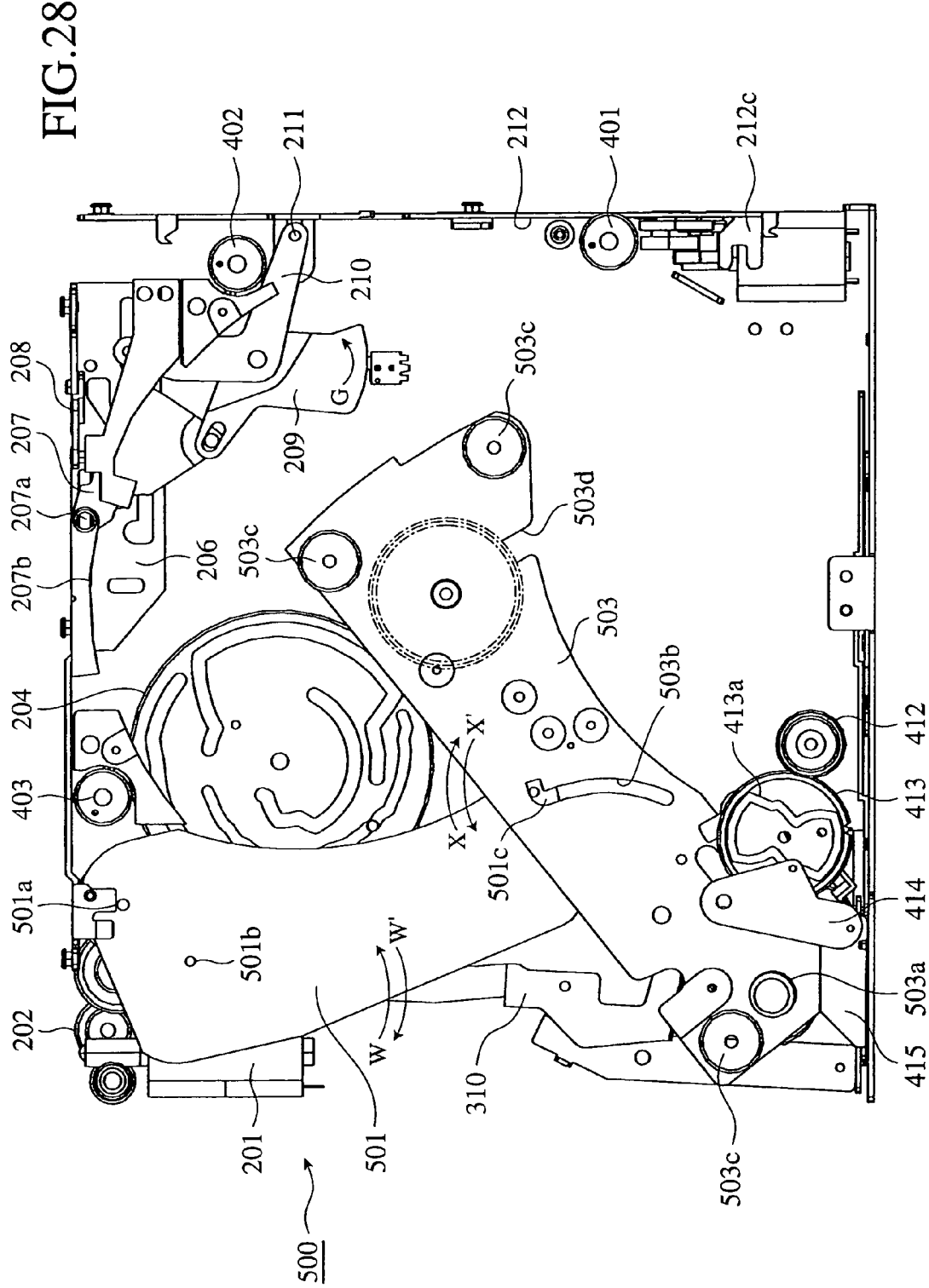
FIG. 28 is a plan view showing the interior of the housing in which the playback unit is made to rotate toward a playback position.
Figure 29:
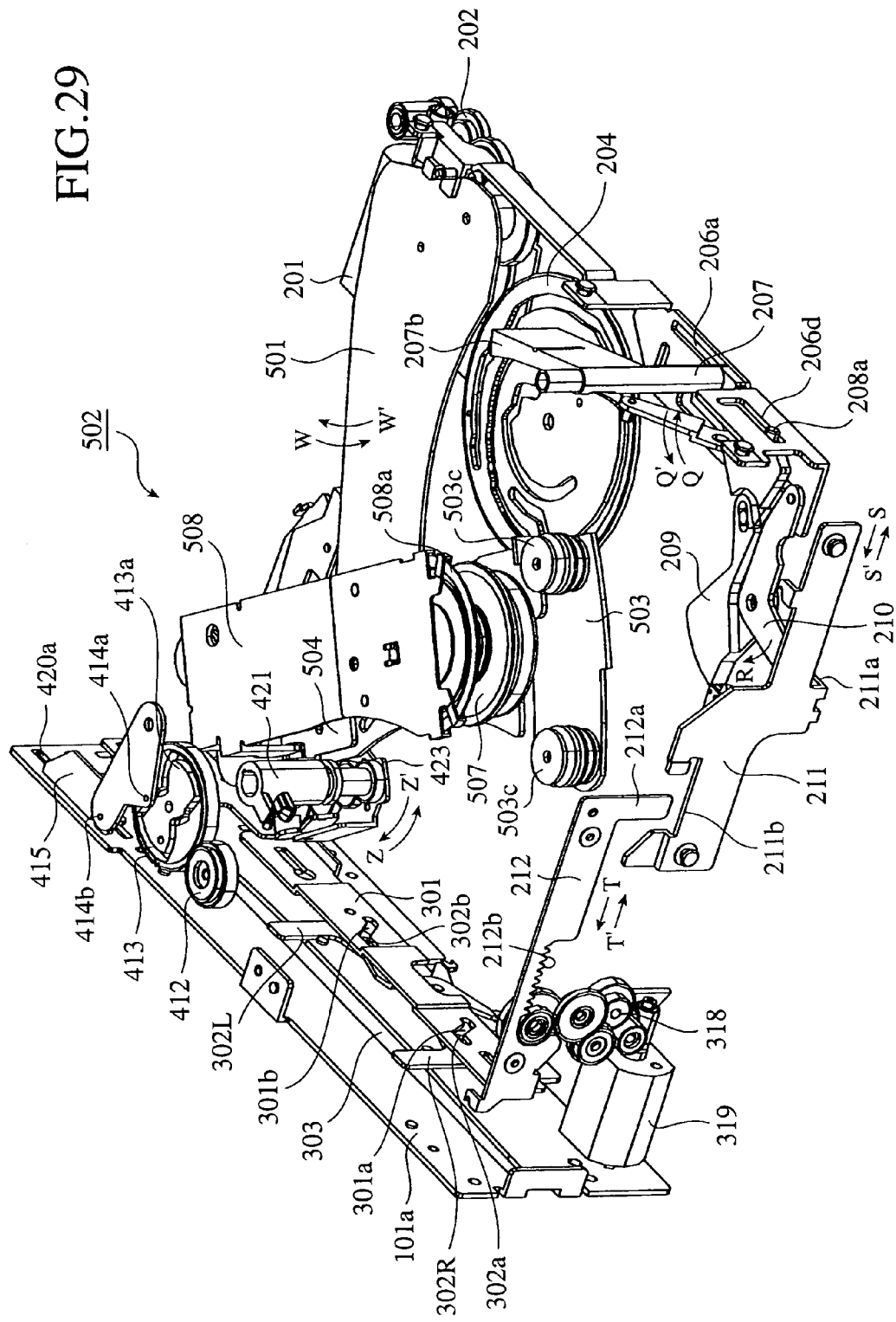
FIG. 29 is a perspective diagram of the disk apparatus when viewed from a right-hand rear side thereof.

Playback Unit 500:

The playback unit 500 has a rotary lever 501, as shown in FIG. 28, having an end which is rotatably supported by an axis 110 of FIG. 15 disposed in the housing 101 and a pin 501b which is disposed thereon and is engaged with the cam groove 203a of the first rotary member 203, and a playback member 502, as shown in FIG. 29, which is moved from its retraction position which is located outside an area including the disk to the disk playback position by the rotary lever 501. The playback member 502 has a playback member supporting plate 503 and a supporting plate 504, as shown in FIG. 29, and the both plates have holes 503a and 504a formed at end portions thereof into which the axis 110 vertically disposed on the bottom plate 101e of the housing 101 is rotatably engaged, respectively, as shown in FIGS. 15 and 28.

Figure 36:
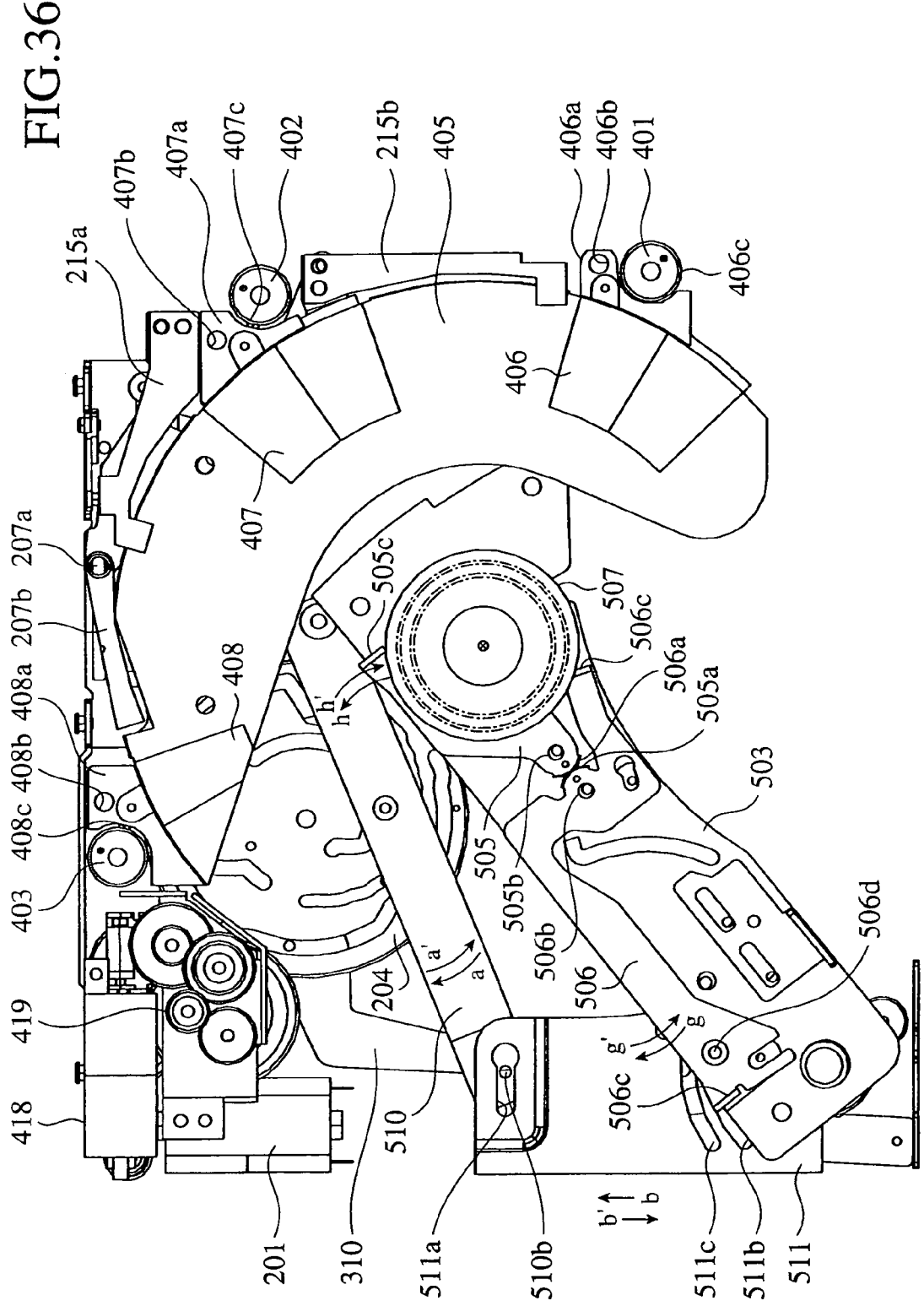
FIG. 36 is a plan view showing the interior of the housing, but in which the top-plate is removed.

As shown in FIG. 28, a cam groove 503b which is engaged with a pin 501c disposed on the above-mentioned rotary lever 501 is formed in the playback member supporting plate 503, and impact-absorbing members 503c are disposed on both a leading edge portion and a base edge portion of the playback member supporting plate 503. In the vicinity of the leading edge portion of the playback member supporting plate 503, a cut groove 503d which is engaged with a disk center positioning member 103, as shown in FIGS. 13 to 15, which is disposed on the bottom plate 101e of the housing 101 is formed. Furthermore, locking members 505 and 506 having gears 505a and 506a which are engaged with each other are rotatably supported by the playback member supporting plate 503 by way of the rotation axes 505b and 506b of the gears 505a and 505b, respectively, as shown in FIG. 36. Engagement members 505c and 506c having engagement dented portions are formed at free end portions of the locking members 505 and 506 so that they are perpendicularly bent with respect to the main portions of the locking members 505 and 506, respectively.

As shown in FIG. 19, the supporting plate 504 has a leading edge portion and a base edge portion in which holes 504b engaged with the upper ends of the impact-absorbing members 503c of the playback member supporting plate 503 shown in FIG. 28 are formed, and a turntable 507 that makes the disk placed thereonto rotate is disposed in the vicinity of the leading edge portion of the supporting plate 504. The turntable 507 is arranged on the axis of a disk type motor 512a disposed on a circuit board 512. A reading unit (i.e., a pickup) 513 that can move between the base edge portion and leading edge portion of the supporting plate 504 so as to read the contents of the disk 450 is disposed.

Furthermore, perpendicularly-bent portions 508b are disposed on both sides of a back end portion of a clamp plate 508 and are rotatably supported via an axis 508c by perpendicularly-bent portions 504c which are disposed on both sides of the base edge portion of the supporting plate 504, respectively. The clamp plate 508 has a leading end portion on which a clamper 508a for pressing the disk toward the turntable 507 so as to hold the disk is disposed so that the clamper can shake, and a coil spring 509 for pressing the clamper 508a toward the turntable 507 is disposed on the back end portion of the clamp plate 508.

Figure 31:
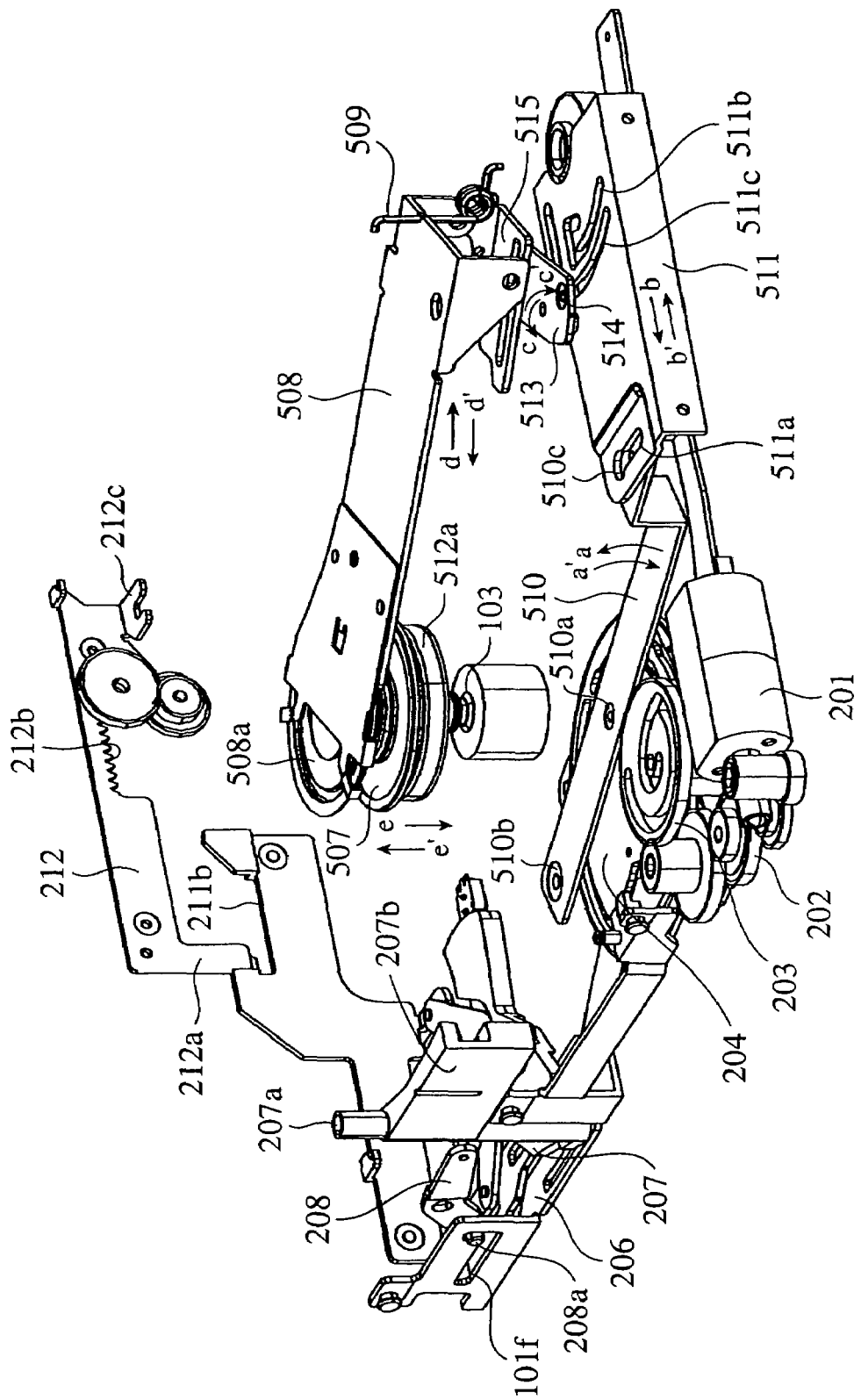
FIG. 31 is a perspective diagram of the disk apparatus when viewed from a left-hand rear side thereof.

As shown in FIG. 31, a driving lever 511 that slides along the inner surface of the left-hand side plate of the housing is connected with the leading end of the third driving lever 510 via engagement between a pin 510c and a long hole 511a, and a cam groove 511b for locking operation and a cam groove 511c for disk chugging operation are formed in the upper surface of the sliding member 511. Furthermore, a pin 506d disposed on the locking member 506 shown in FIG. 36 is engaged with the cam groove 511b for locking operation, and a driving plate 515 and a connecting plate 513 which are disposed on the clamp plate 508 are connected so that they can shake. A pin 514 disposed on the connecting plate 513 is engaged with the cam groove 511c for disk chugging operation.

Next, operations of the disk apparatus in accordance with this embodiment of the present invention will be explained. Operations of inserting a disk into the disk apparatus, and placing the disk at the playback position:

First, a switch not shown in the figures is closed and the motor 201 shown in FIG. 17 is started. The motor 201 then makes the first and second rotary members 203 and 204 rotate by way of the gear series 202. As shown in FIG. 17, the rotation of the second rotary member 204 results in rotation of the second driving lever 310 engaged with the cam groove 204b in a direction of an arrow A, a middle lever 311 is therefore made to rotate in a direction of an arrow B, and the cam plate 301 is made to move in a direction of an arrow C. As a result, the shutters 302R and 302L having their respective pins 302a and 302b engaged with the cam grooves 301a and 301b of the cam plate 301 are made rotate in directions of arrows D and E, respectively, and the disk insertion/ejection opening 303 is then opened.

At this time, as shown in FIGS. 18 and 20, the playback unit 500 is retracted to outside an area where the disk can be moved, the disk conveying plate 315 is placed on a side of the front side plate of the housing 101, and a desired or selected stocker 405 is moved to a disk conveyance level at which the disk can be conveyed. Furthermore, only a part of the desired stocker which is engaged with the spiral groove 401a of the rotation axis 401, which is the closest to the disk insertion/ejection opening 303, is moved downward to the playback unit retraction level.

In this state, when a sensor not shown in the figures detects the disk inserted into the disk apparatus via the disk insertion/ejection opening 303, the motor 319 of FIG. 20 is started in response to a detection signal from the sensor, and then rotates the roller 317 by way of the gear series 318. As a result, the upper and lower surfaces of the disk are guided by the disk conveying plate 315 and the selected stocker 504, and the right-hand and left-hand sides of the disk are guided by the rotation axis 401 and a side wall of the clamp plate 508 of FIG. 19, so that the disk is conveyed to the inner side of the housing 101. As shown in FIG. 39, detection of which mode the second rotary member 204 is placed in is performed by using the sensor driving lever 213 which is engaged with the cam groove 204c of the second rotary member 204 by way of the pin 213a, and the position sensor 214 having the pin 214a which is engaged with the forked member 213b disposed at the leading end of the sensor driving lever 213.

When the inserted disk 450 is conveyed to a predetermined position, the disk detection plate 207b is pushed by the disk and is then made to rotate in a direction of an arrow F, and the switch lever 209 is made to rotate in a direction of an arrow G by way of the lever 207, as shown in FIG. 20. As a result, a switch 216 is closed.

Then, as shown in FIG. 17, further rotation of the second rotary member 204 caused by further driving of the motor 201 rotates the second driving lever 310 in a direction of an arrow A', rotates the middle lever 311 in a direction of an arrow B', and moves the cam plate 301 in a direction of an arrow C'. As a result, the shutters 302R and 302L of FIG. 11 are made to project toward the disk insertion path, and the disk insertion/ejection opening 303 is then closed.

Figure 22:
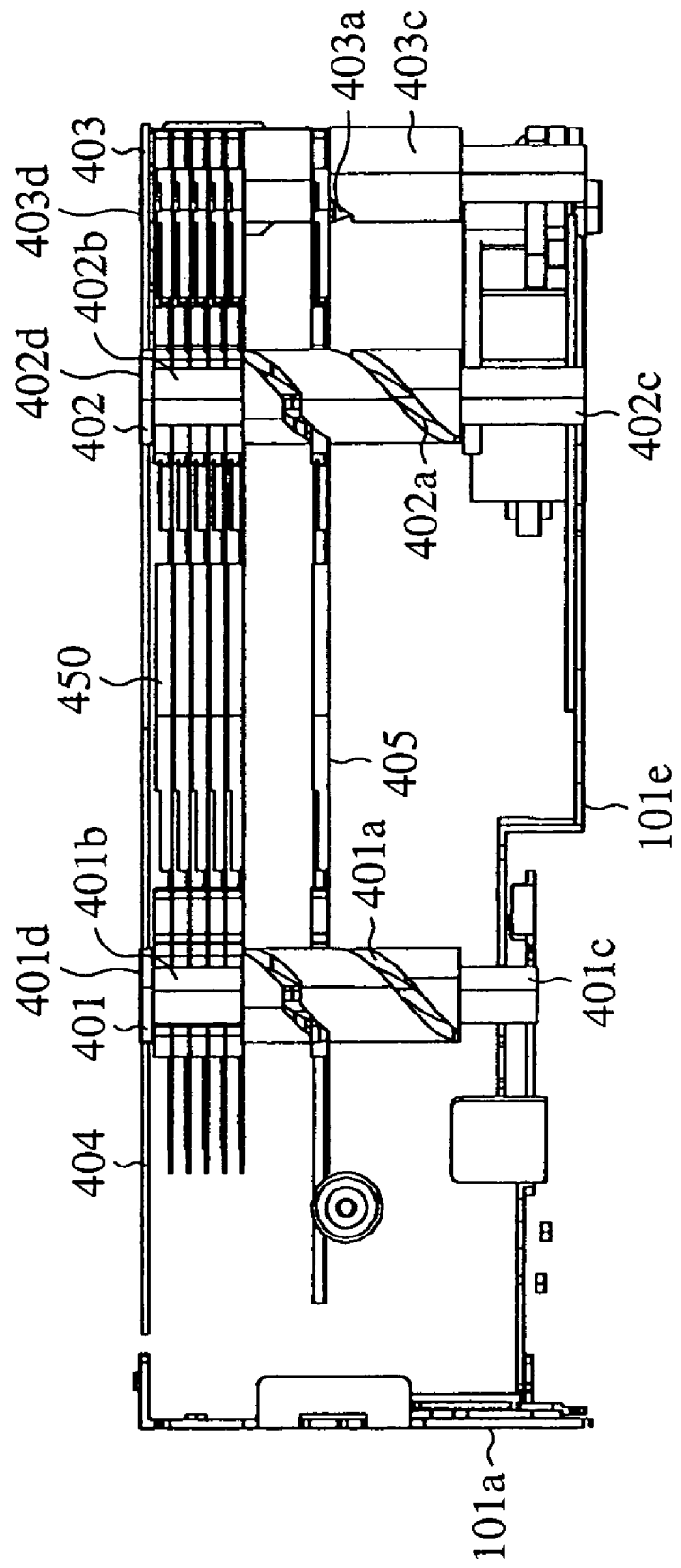
FIG. 22 is a side view showing the right-hand side of the disk apparatus, but in which the right-hand side plate is removed at a time of disk installation.

On the other hand, when the motor 418 is started in response to a close signal from the switch 216, the rotation axes 401, 402, and 403 are made to rotate by way of the gear series 419, the large-diameter gear 404, and the gears 401d, 402d, and 403d, as shown in FIG. 21, and the disk insertion side of the selected stocker 504 is moved back to the disk conveyance level by way of the pins 406c, 407c, and 408c of the projecting portions of the supporting members which are respectively engaged with the spiral grooves 401a, 402a, and 403a of the rotation axes 401, 402, and 403, as shown in FIG. 22.

Simultaneously, the gear 412 is made to rotate and the shaking lever 414 having the pin 414a which is engaged with the 8-shaped cam groove 413a of the gear 413 engaged with the gear 412 is also made rotate in a direction of an arrow H. Movement of the sliding plate 415 in a direction of an arrow J, movement of the sliding plate 416 in a direction of an arrow K, and rotation of the rotary plate 417 in a direction of an arrow L, which are caused by the rotation of the shaking lever 414, results in an upward movement of the disk guide member 421 in a direction of an arrow M to the disk conveyance level, as shown in FIG. 21.

Then, as shown in FIG. 23, further rotation of the second rotary member 204 caused by further driving of the motor 201 rotates the first driving lever 205 in a direction of an arrow N, and moves the sliding plate 20 in a direction of an arrow P. As a result, the disk detection plate 207b is rotated and retracted in a direction of an arrow F. Pressures by the stocker flat springs 215a and 215b which press the disk toward the stocker are released by further movement of the sliding plate 206 in the direction of the arrow P, movement of the lever 208 in a direction of an arrow Q, movement of the L-shaped lever 210 in a direction of an arrow R, and movement of the sliding plate 211 in a direction of an arrow S. As a result, the sliding plate 212 is brought into contact with the sliding plate 211, and the sliding plate 212 is pressed by the sliding plate 211.

As a result, as shown in FIGS. 23 and 24, the sliding plate 212 is made to travel a predetermined distance in a direction of an arrow T, and the forked engaging member 212c makes the locking member 322 rotate in a direction of an arrow U. As a result, the engagement between the pin 322b and the L-shaped groove 314d is released. Simultaneously, the second driving lever 310 is made to rotate in the direction of the arrow A, and the disk guide member 421 is made to rotate in a direction of an arrow f by way of the gear series 422. As a result, the disk 450 is sandwiched by the sandwiching portion 421a of the disk guide member 421, as shown in FIG. 23. Then, when the motor 319 is started, the sliding plate 212, in which the rack 212b is pushed and moved by the sliding plate 211 and is then engaged with one gear of the gear series 320, moves the disk conveying plate 315 toward the disk insertion/ejection opening (i.e., in a direction of an arrow V of FIG. 20) in response to the driving force from the motor 319.

Figure 26:
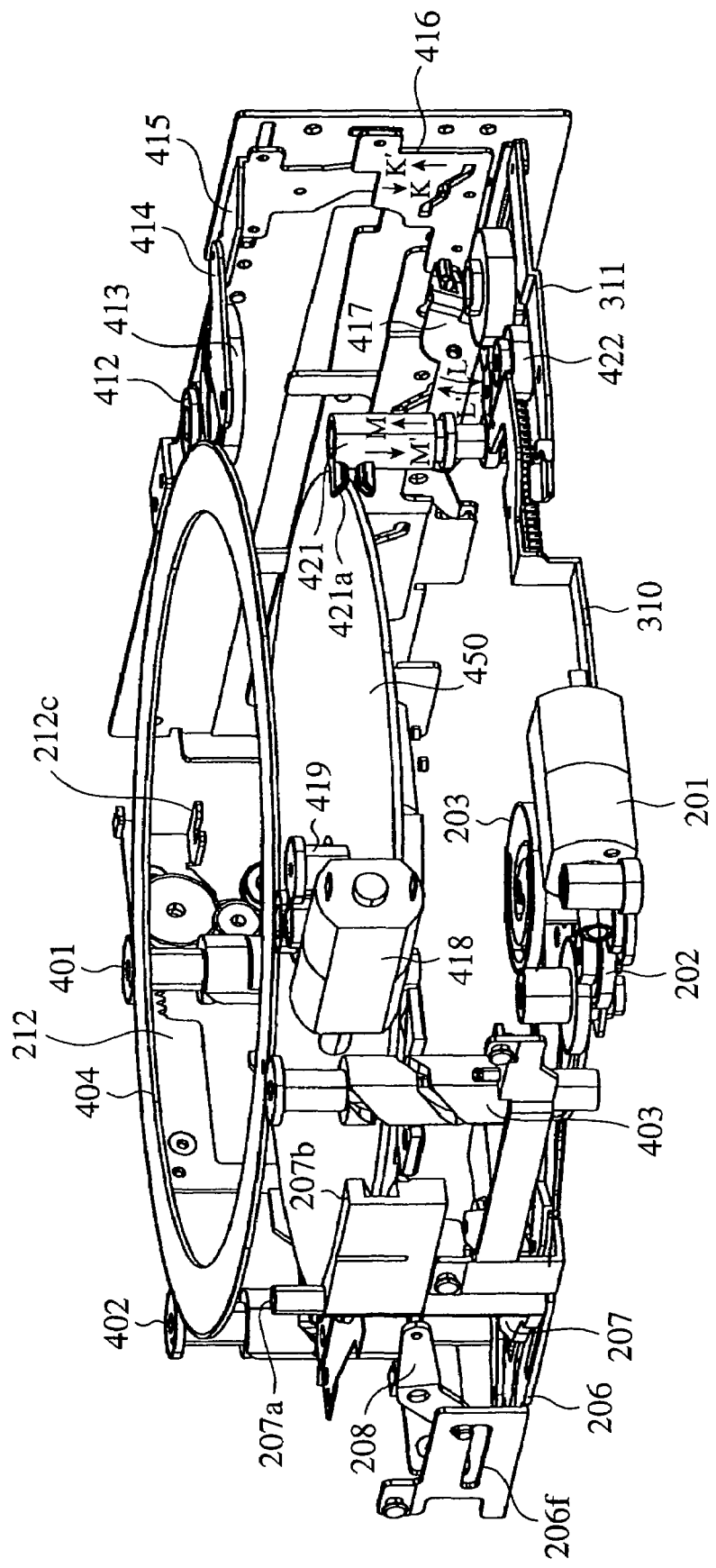
FIG. 26 is a perspective diagram of the disk apparatus when viewed from a left-hand rear side thereof.
Figure 27:
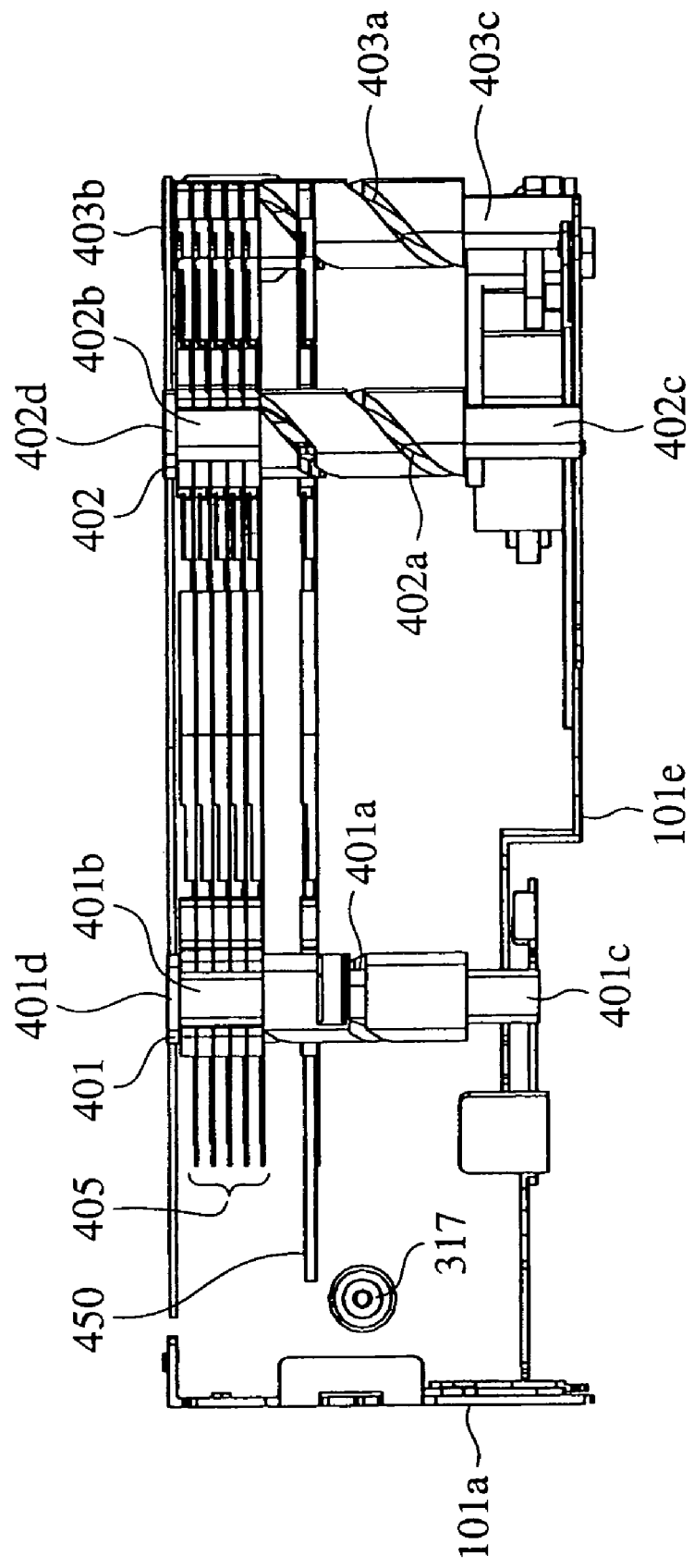
FIG. 27 is a side view showing the right-hand side of the disk apparatus at a time of inserting a disk into a playback unit.

On the other hand, further rotation of the motor 418 rotates the rotation axes 401, 402, and 403 by way of the gear series 419, the large-diameter gear 404, and the gears 401d, 402d, and 403d, and the selected stocker 504 is moved up to the playback unit entry level, as shown in FIG. 27. Simultaneously, the gear 412 is made to rotate and the shaking lever 414 having the pin 414a which is engaged with the 8-shaped cam groove 413a of the gear 413 engaged with the gear 412 is made to rotate in the direction of the arrow H, as shown in FIG. 21. Movement of the sliding plate 415 in the direction of the arrow J, movement of the sliding plate 416 in the direction of the arrow K, and rotation of the rotary plate 417 in the direction of the arrow L, which are caused by the rotation of the shaking lever 414, results in an upward movement of the disk guide member 421 up to the playback unit entry level with the disk guide member 421 holding the disk, as shown in FIG. 26.

The spiral cam groove 203a of the first rotary member 203, which is driven, via the gear series 202, by the motor 201, makes the rotary lever 501 rotate in a direction of an arrow W shown in FIG. 28, and the cut groove 503d of the playback member supporting plate 503 is engaged with the disk center positioning member 103. As a result, as shown in FIG. 28, the axis of the turntable 507 matches with the axis of the disk held by the selected stocker 504.

The above-mentioned rotation of the playback member supporting plate 503 brings the supporting plate 504 arranged on the playback member supporting plate into contact with the disk guide member 421, rotates the rotation axis supporting plate 423 in a direction of an arrow Z of FIG. 29, and retracts the disk guide member 421 from the playback unit entry position. At this time, the clamp plate 508 is placed in a non-chugging state.

Figure 30:
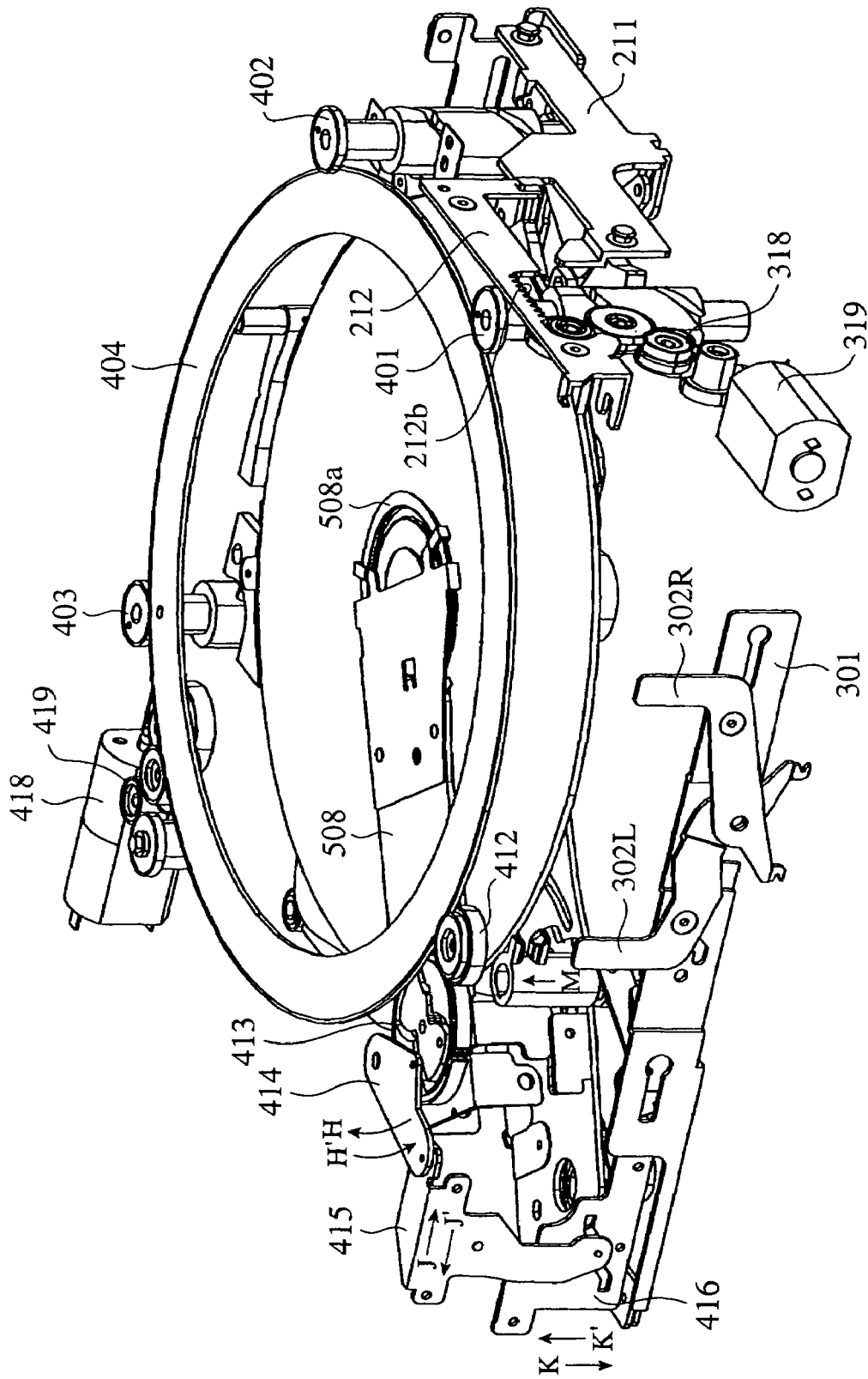
FIG. 30 is a perspective diagram of the disk apparatus when viewed from a right-hand front side thereof.

When the motor 418 further rotates and hence the rotation axes 401, 402, and 403 rotate by way of the gear series 419, the large-diameter gear 404, and the gears 401d, 402d, and 403d, the engaging portion of the selected stocker 504 descends to the disk chugging level (i.e., the disk conveyance level), as shown in FIG. 22. Simultaneously, the rotation of the gear 412 makes the shaking lever 414 having the pin 414a which is engaged with the 8-shaped cam groove 413a of the gear 413 engaged with the gear 412 rotate in a direction of an arrow H', as shown in FIG. 30, and movement of the sliding plate 415 in a direction of an arrow J', movement of the sliding plate 416 in a direction of an arrow K', and rotation of the rotary plate 417 in a direction of an arrow L', which are caused by the rotation of the shaking lever 414, make the disk guide member 421 descend in a direction of an arrow M' to the chugging level and place the disk 450 on the turntable 507, as shown in FIGS. 26 and 30.

Figure 33:
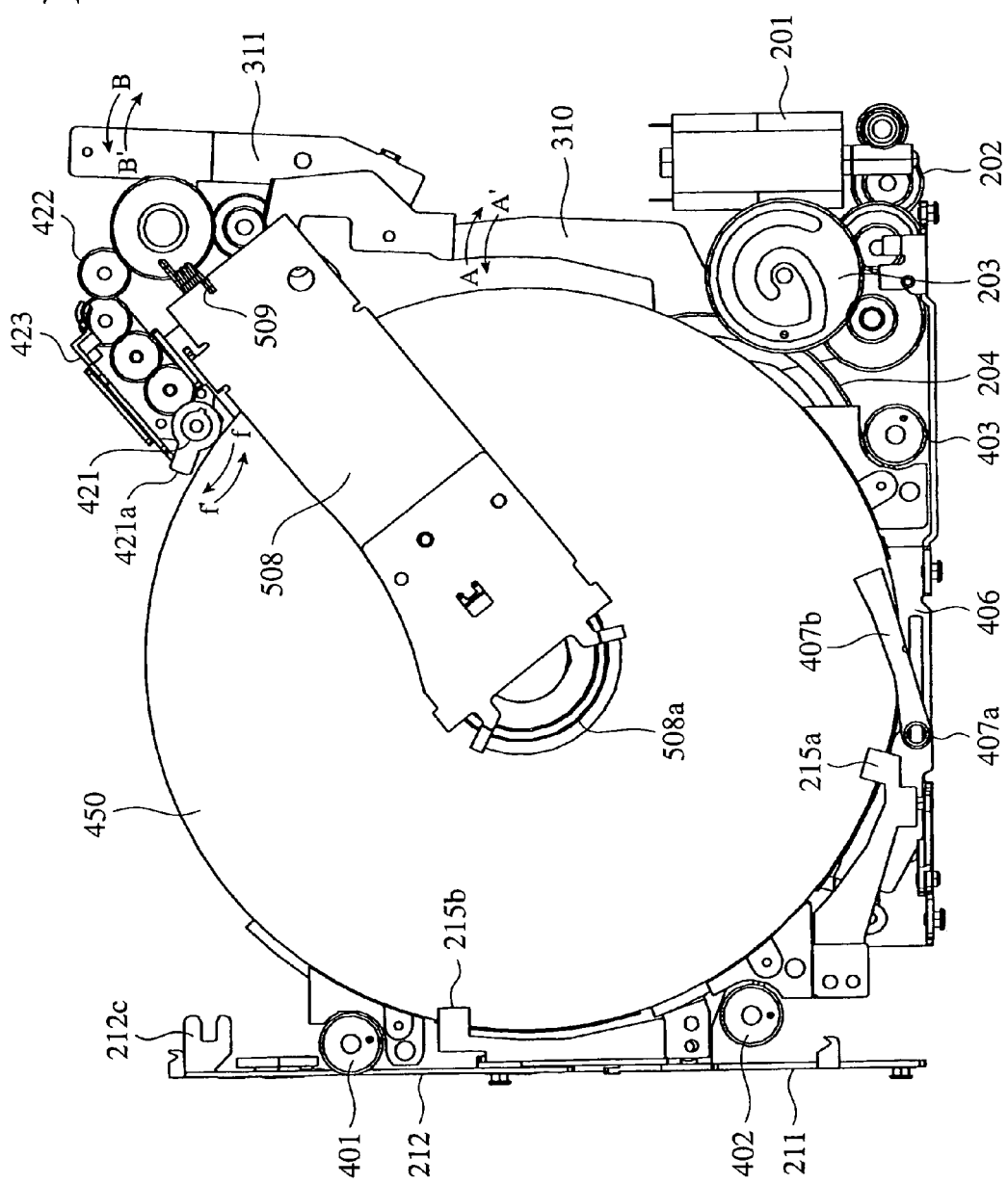
FIG. 33 is a plan view showing the interior of the housing of the disk apparatus in a playback state.

By virtue of the motor 201, the gear series 202, and the cam groove 204d of the second rotary member 204, the lever 510 rotates in a direction of an arrow a, the slide member 511 moves in a direction of an arrow b, the connecting plate 513 rotates in a direction of an arrow c, and the driving plate 515 of the clamp plate 508 moves in a direction of an arrow d, as shown in FIG. 31. As a result, since a rotation preventing member (not shown in the figure) of the clamp plate 508, which is disposed on the driving plate 515, releases prevention of rotation of the clamp plate, the clamp plate 508 descends in a direction of an arrow e because of the spring force of the coil spring 509, as shown in FIG. 31, and the clamper 508a presses the disk toward the turntable 507 so that the disk is placed in the chugging state, as shown in FIG. 33.

Figure 32:
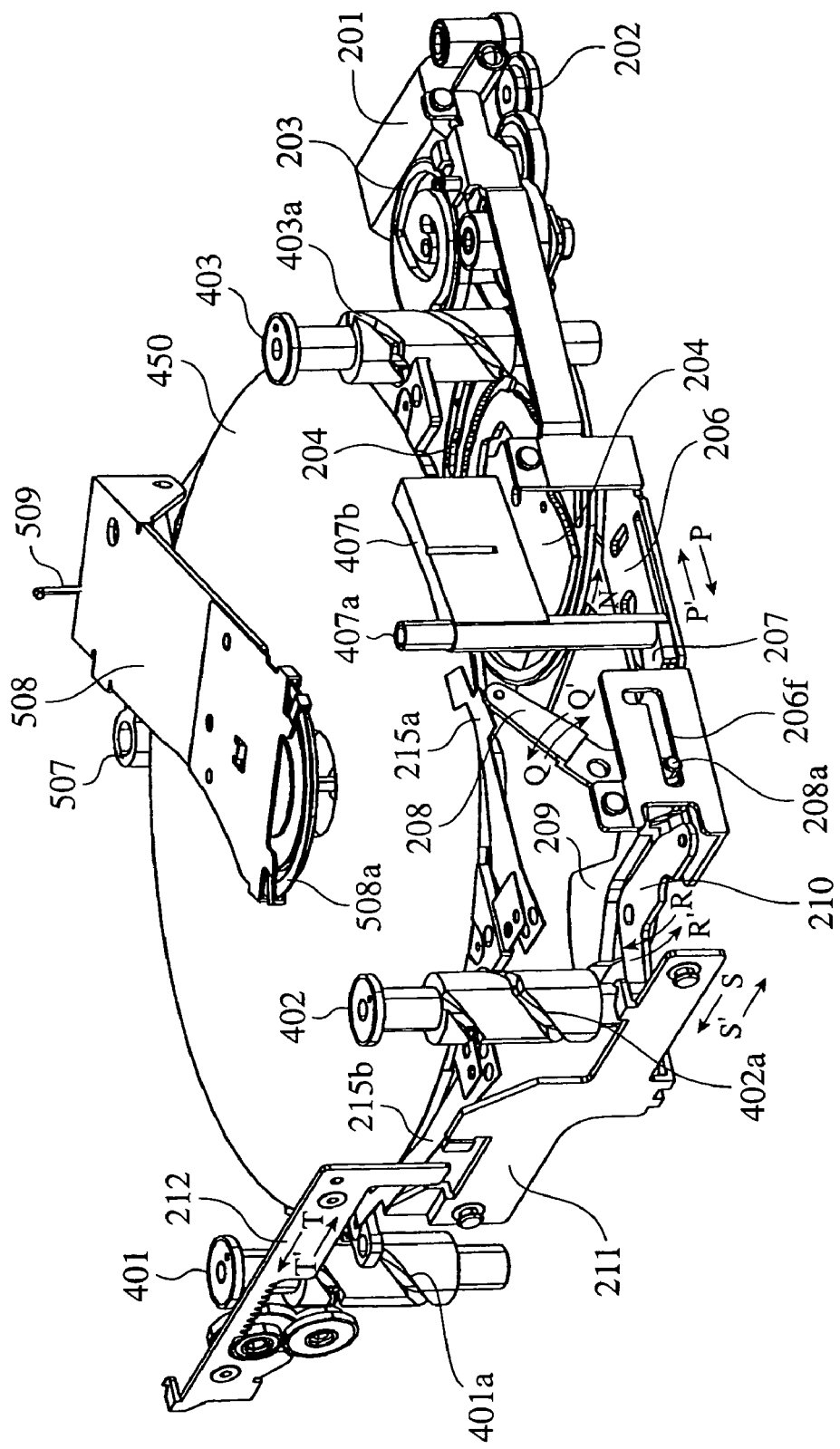
FIG. 32 is a perspective diagram of the disk apparatus when viewed from a right-hand rear side thereof.

Further rotation of the second rotary member 204 caused by further driving of the motor 201 causes movement of the first driving lever 205 in a direction of an arrow N', movement of the sliding plate 206 in a direction of an arrow P', rotation of the lever 208 in a direction of an arrow Q', rotation of the L-shaped lever 210 in a direction of an arrow R', and movement of the sliding plate 211 in a direction of an arrow S', as shown in FIGS. 24 and 25. As a result, end portions of the lever 208 and the sliding plate 211 are brought into contact with the stocker flat springs 215a and 215b, respectively, and the stocker flat springs 215a and 215b are then pushed upward so that they are retracted from the disk, as shown in FIG. 32. Simultaneously, as shown in FIG. 33, the second-driving lever 310 is made to rotate in the direction of the arrow A', and the disk guide member 421 is made to rotate in a direction of an arrow f' by way of the gear series 422. As a result, the holding of the disk by the sandwiching member 421a is released.

Figure 34:
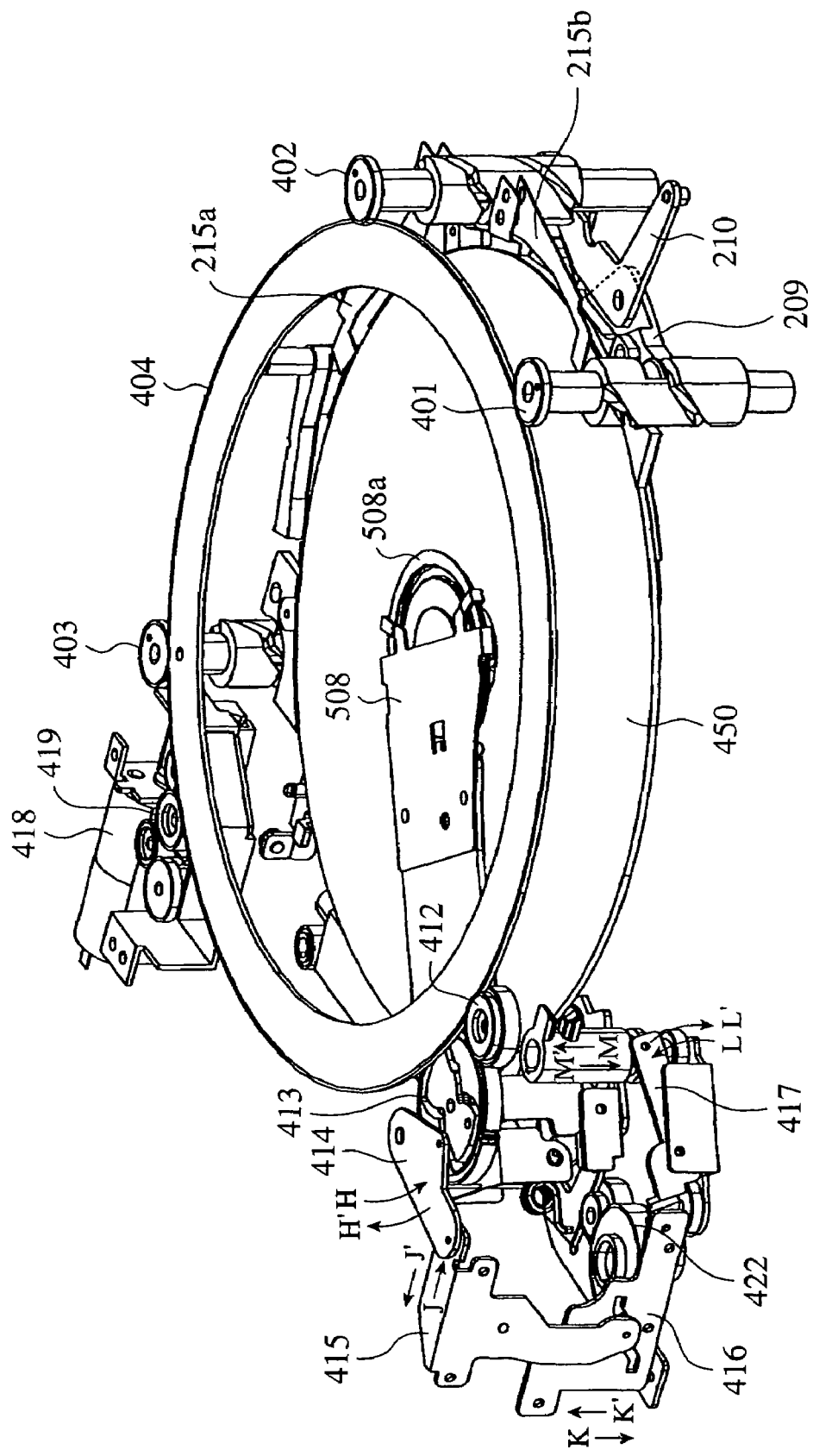
FIG. 34 is a perspective diagram of the disk apparatus when viewed from a right-hand front side thereof.
Figure 35:
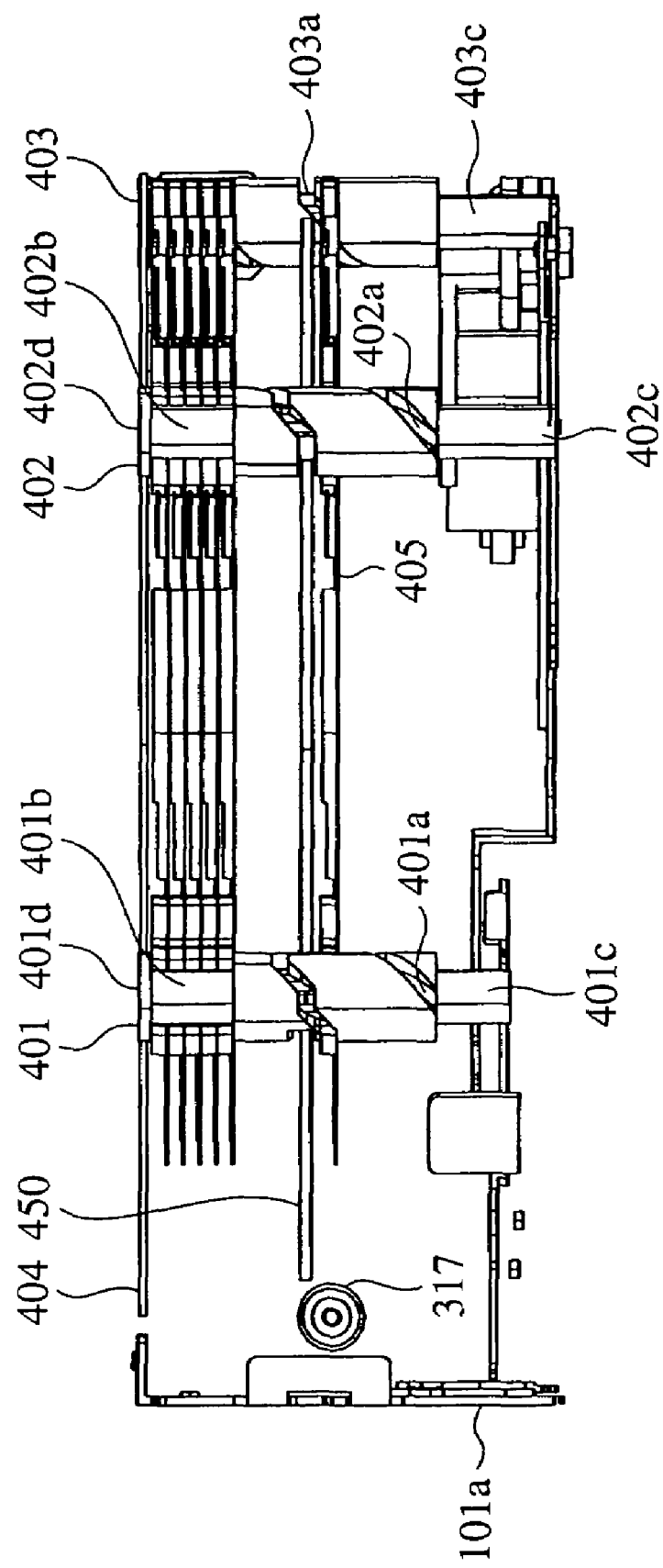
FIG. 35 is a side view showing the right-hand side of the disk apparatus in the playback state.

When the motor 418 further rotates and hence the rotation axes 401, 402, and 403 further rotate because of the driving force of the motor applied thereto by way of the gear series 419, the large-diameter gear 404, and the gears 401d, 402d, and 403d, the selected stocker 504 descends to a playback level, as shown in FIG. 35. Simultaneously, the rotation of the gear 412 makes the shaking lever 414 having the pin 414a which is engaged with the 8-shaped cam groove 413a of the gear 413 engaged with the gear 412 rotate in a direction of an arrow H', as shown in FIG. 30, and movement of the sliding plate 415 in a direction of an arrow J', movement of the sliding plate 416 in a direction of an arrow K', and rotation of the rotary plate 417 in a direction of an arrow L', which are caused by the rotation of the shaking lever 414, make the disk guide member 421 descend in the direction of the arrow M' to the playback unit retraction level, as shown in FIG. 34. As a result, the disk guide member 421 is retracted from the disk to be played back.

By virtue of the motor 201, the gear series 202, and the cam groove 204d of the second rotary member 204, the lever 510 rotates in the direction of the arrow a, and the slide member 511 moves in the direction of the arrow b, as shown in FIG. 31. As a result, the locking members 505 and 506 are made to rotate in directions of arrows g and h, respectively, as shown in FIG. 36, and the locking of the supporting plate 504 shown in FIG. 29 is then released. The disk apparatus thus advances to the playback operation.

Operations which are performed by the disk apparatus until the disk is ejected after played back:

The motor 201, the gear series 202, and the cam groove 204d of the second rotary member 204 rotate the lever 510 in a direction of an arrow a', and move the slide member 511 in a direction of an arrow b'. As a result, the locking members 505 and 506 are made to rotate in directions of arrows g' and h', respectively, as shown in FIG. 36, and the supporting plate 504 shown in FIG. 29 is locked.

The driving of the motor 418 causes the rotation axes 401, 402, and 403 to rotate by way of the gear series 419, the large-diameter gear 404, and the gears 401d, 402d, and 403d until the engagement portion of the selected stocker 504 ascends up to the disk chugging level, as shown in FIG. 22. Simultaneously, the gear 412 is made to rotate and the shaking lever 414 having the pin 414a which is engaged with the 8-shaped cam groove 413a of the gear 413 engaged with the gear 412 is also made to rotate in the direction of the arrow H. Movement of the sliding plate 415 in the direction of the arrow J, movement of the sliding plate 416 in the direction of the arrow K, and rotation of the rotary plate 417 in the direction of the arrow L, which are caused by the rotation of the shaking lever 414, results in an upward movement of the disk guide member 421 in the direction of the arrow M to the disk chugging level, as shown in FIG. 34.

Then, further rotation of the second rotary member 204 caused by further driving of the motor 201 rotates the first driving lever 205 in the direction of the arrow N, and moves the sliding plate 206 in the direction of the arrow P. As a result, the lever 208 rotates in the direction of the arrow Q, the L-shaped lever 210 rotates in the direction of the arrow R, and the sliding plate 211 slides in the direction of the arrow S, and therefore the contact of the end portions of the lever 208 and the sliding plate 211 with the stocker flat springs 215a and 215b is released and the stocker flat springs 215a and 215b are brought into contact with the disk, as shown in FIG. 24. Simultaneously, the second driving lever 310 rotates in the direction of the arrow A', and the disk guide member 421 rotates in the direction of the arrow f by way of the gear series 416, so that the disk is held by the sandwiching portion 421a of the disk guide member 421, as shown in FIG. 33.

In addition, by virtue of the motor 201, the gear series 202, and the cam groove 204d of the second rotary member 204, the lever 510 rotates in the direction of the arrow a, the slide member 511 moves in the direction of the arrow b, the connecting plate 513 rotates in a direction of an arrow c', and the driving plate 515 of the clamp plate 508 moves in a direction of an arrow d', as shown in FIG. 31. As a result, the clamp plate 508 ascends in a direction of an arrow e' against the spring force of the coil spring 509, and the clamper 508a is detached from the disk, as shown in FIG. 31.

When the motor 418 further rotates and hence the rotation axes 401, 402, and 403 rotate by way of the gear series 419, the large-diameter gear 404, and the gears 401d, 402d, and 403d, the engaging portion of the selected stocker 504 ascends up to the playback unit entry level, as shown in FIG. 27. Simultaneously, the rotation of the gear 412 makes the shaking lever 414 having the pin 414a which is engaged with the 8-shaped cam groove 413a of the gear 413 engaged with the gear 412 rotate in the direction of the arrow H, and movement of the sliding plate 415 in the direction of the arrow J, movement of the sliding plate 416 in the direction of the arrow K, and rotation of the rotary plate 417 in the direction of the arrow L, which are caused by the rotation of the shaking lever 414, make the disk guide member 421 ascend in the direction of the arrow M to the playback unit entry level and the disk is detached from the turntable 507, as shown in FIG. 30.

By virtue of the motor 201 and the spiral cam groove 203a of the first rotary member 203 which is driven via the gear series 202 by the motor 201, the rotary lever 501 is made to rotate in the direction of the arrow W', as shown in FIGS. 28 and 29, and the playback member supporting plate 503 that supports the whole of the playback unit is made to rotate and retract to a position where the playback member supporting plate 503 is located outside the disk storage area of the disk apparatus. The rotation and retraction of the playback member supporting plate 503 causes the rotation axis supporting plate 423 to rotate in the direction of the arrow Z', and the disk guide member 421 then returns to its initial position.

When the motor 418 further rotates and hence the rotation axes 401, 402, and 403 rotate by way of the gear series 419, the large-diameter gear 404, and the gears 401d, 402d, and 403d, the selected stocker 504 descends to the disk conveyance level, as shown in FIG. 22. Simultaneously, the rotation of the gear 412 makes the shaking lever 414 having the pin 414a which is engaged with the 8-shaped cam groove 413a of the gear 413 engaged with the gear 412 rotate in the direction of the arrow H', and movement of the sliding plate 415 in the direction of the arrow J', movement of the sliding plate 416 in the direction of the arrow K', and rotation of the rotary plate 417 in the direction of the arrow L', which are caused by the rotation of the shaking lever 414, make the disk guide member 421 descend in the direction of the arrow M' to the disk conveyance level, as shown in FIG. 26.

When the motor 319 then rotates, the sliding plate 212 moves in the direction of the arrow T' by way of the gear series 320, and the disk conveying plate 315 moves to the back side of the housing 101 immediately before it is locked by the locking member 322, as shown in FIG. 24. By virtue of this movement of the sliding plate 212, the pin 321 is made to move along the cam groove 101g formed in the right-hand side plate 101b of the housing, the rotary plate 316 is made to rotate in a direction of an arrow 1' of FIG. 1, and the gear 318 disposed in the disk conveying roller axis is engaged with the gear series 320.

The rotation of the second rotary member 204 caused by the driving of the motor 201 rotates the first driving lever 205 in the direction of the arrow N', and moves the sliding plate 206 in the direction of the arrow P', rotates the lever 208 in the direction of the arrow Q', rotates the L-shaped lever 210 in the direction of the arrow R', and moves the sliding plate 211 in the direction of the arrow S', as shown in FIG. 24, and therefore the end portions of the lever 208 and the sliding plate 211 are brought into contact with the stocker flat springs 215a and 215b; respectively, and the stocker flat springs 215a and 215b are pushed upward. The contact of the sliding plate 211 with the sliding plate 212 is released.

As a result, the sliding plate 212 moves to its initial position in the direction of the arrow T', and the locking member 322 is made to rotate in the direction of the arrow U' by the forked engaging member 212 and then enters the locking state. Simultaneously, the second driving lever 310 rotates in the direction of the arrow A', and the disk guide member 421 rotates in the direction of the arrow f' by way of the gear series 422, and the holding of the disk by the disk supporting portion 421a of the disk guide member 421 is released, as shown in FIG. 24. Furthermore, the sliding plate 206 moves in the direction of the arrow P', and the restriction on rotation of the disk detection plate 207b is released.

When the motor 418 further rotates and hence the rotation axes 401, 402, and 403 rotate by way of the gear series 419, the large-diameter gear 404, and the gears 401d, 402d, and 403d, the front side of the engaging portion of the selected stocker 504 descends to the playback unit retraction level, as shown in FIG. 18. Simultaneously, the rotation of the gear 412 makes the shaking lever 414 having the pin 414a which is engaged with the 8-shaped cam groove 413a of the gear 413 engaged with the gear 412 rotate in the direction of the arrow H', and movement of the sliding plate 415 in the direction of the arrow J', movement of the sliding plate 416 in the direction of the arrow K', and rotation of the rotary plate 417 in the direction of the arrow L', which are caused by the rotation of the shaking lever 414, make the disk guide member 421 descend in the direction of the arrow M', as shown in FIG. 21. As a result, the disk is made to descend to the playback unit retraction level, as shown in FIG. 22.

The rotation of the second rotary member 204 caused by the driving of the motor 201 rotates the second driving lever 310 in the direction of the arrow A, and also rotates the middle lever 311 in the direction of the arrow B. As a result, the cam plate 301 is moved in the direction of the arrow C, and, as shown in FIG. 17, the shutters 302R and 302L are then apart from the disk conveyance path and the disk insertion/ejection opening 303 is opened.

The motor 319 is then made to rotate and the disk conveying roller 317 is made to rotate by way of the gear series 320.

As a result, and the disk is ejected. When the disk is ejected via the disk insertion/ejection opening 303 to a predetermined position, a sensor (not shown) detects this ejection and the motor 319 is stopped, and the disk apparatus enters a state shown in FIG. 19.

Figure 37:
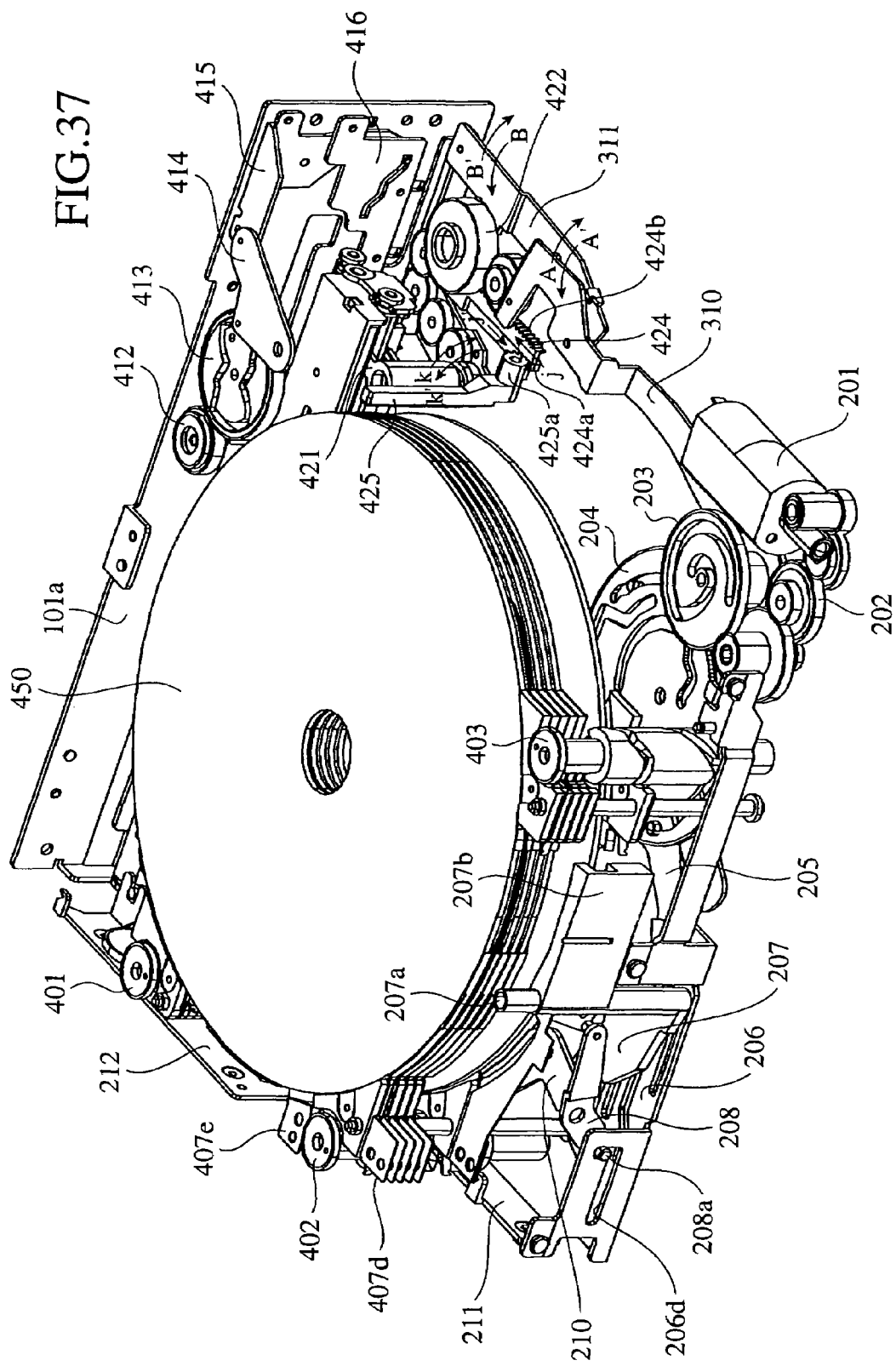
FIG. 37 is a perspective diagram of the disk apparatus when viewed from a left-hand rear side thereof.

Disk Changing Operation:

In the above-mentioned way, the playback unit 500 is made to rotate from the disk playback position to the playback unit retraction position, and the disk guide member 421 is made to return to its initial position. After that, when the second rotary member 204 rotates, the second driving lever 310 rotates in the direction of the arrow A' and the disk guide member 421 rotates in the direction of the arrow f' by way of the gear series 422. As a result, the sandwiching of the disk by the sandwiching portion 421a of the disk guide member 421 is released. Simultaneously, as shown in FIG. 37, a rack member 424 which is engaged with one gear of the gear series 422 moves in a direction of an arrow j, and is then engaged with a gear member 425a of a rotary member 425, and the rotary member 425 then rotates in a direction of an arrow k and stands up because of further movement of the rack member 424. As a result, all disks are prevented from projecting from the plurality of stockers 405 which are in contact with the outer edges of all the disks, as shown in FIG. 37.

When the motor 418 further rotates and hence the rotation axes 401, 402, and 403 rotate by way of the gear series 419, the large-diameter gear 404, and the gears 401d, 402d, and 403d, the selected stocker 504 moves to a desired level.

Figure 38:
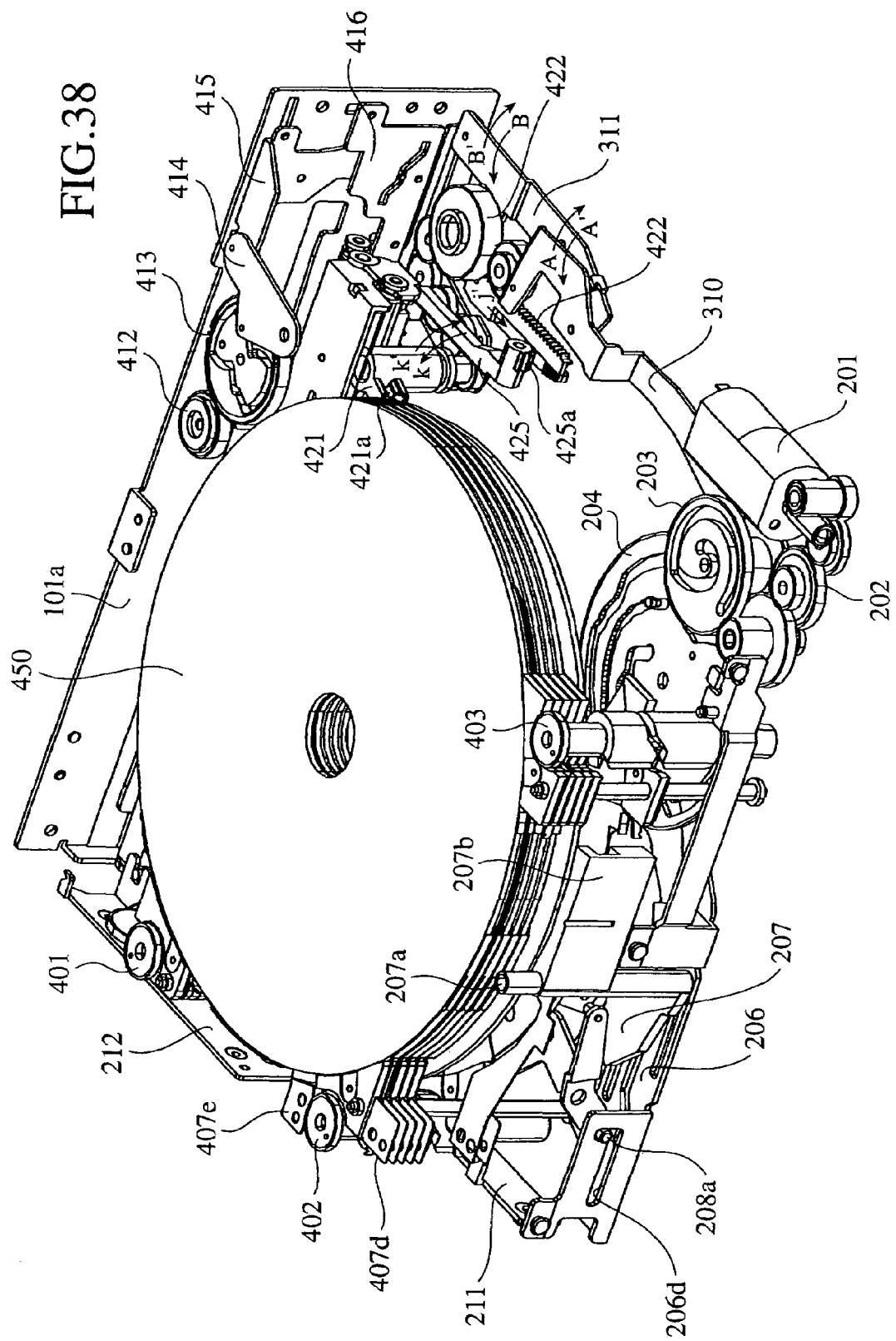
FIG. 38 is a perspective diagram of the disk apparatus when viewed from a left-hand rear side thereof.

The rotation of the second rotary member 204 caused by the driving of the motor 201 rotates the second driving lever 310 in the direction of the arrow A. As a result, the rack member 424 which is engaged with one gear of the gear series 422 moves in a direction of an arrow j', and the rotary member 425 having the gear member 425a which is engaged with the rack member 424 rotates and is retracted in a direction of an arrow k' by virtue of the movement of the rack member. Simultaneously, by virtue of the rotation of the gear series 422, the disk guide member 421 rotates in a direction of an arrow f' and holds the disks, as shown in FIG. 38.

When playing back a selected disk 450, the playback unit 500 is made to rotate to a position where the axis of the turntable 507 matches with the axis of the selected disk in the above-mentioned way, and the selected disk 450 is placed on the turntable 507 and is placed in the chugging state. The stocker flat springs 215a and 215b are then made to be retracted from the disk and the locking of the playback member 502 is released. The disk apparatus thus shifts to the playback operation.

Many widely different embodiments of the present invention may be constructed without departing from the spirit and scope of the present invention. It should be understood that the present invention is not limited to the specific embodiments described in the specification, except as defined in the appended claims.

What is claimed is:

1. A disk apparatus comprising:
   a supporting means including a base plate having a plurality of base plate guide grooves including a first base plate groove with a straight portion which is parallel to a disk conveyance path and a second base plate groove being an L-shaped guide groove having a straight portion which is parallel to said disk conveyance path and a locking portion which is perpendicular to said straight portion of said second base plate groove;
   a disk conveying means including a disk guide plate that is supported from the base plate by a plurality of disk guide plate pins disposed on said disk guide plate, and with said guide plate pins being swaged so they cannot be disconnected from the plurality of base plate guide grooves while having said guide plate pins operate within the said base plate guide groove to move in the disk conveying direction;
   an actuation means including a locking lever that is rotatably supported by said supporting means with a first locking lever pin disposed on said locking lever, with said first locking lever pin being swaged so said first locking lever pin is operably confined within said L-shaped groove; and a second locking lever pin which is engaged by a bisected, forked shaped member being disposed on a top portion of a sliding plate, located over and immediately superior to said actuation means.

2. The disk apparatus according to claim 1, wherein said bisected, forked shaped member disposed on a top portion of the sliding plate moves said sliding plate relative to and towards the disk conveying direction.

3. The disk apparatus according to claim 2, wherein said actuation means moves said sliding plate for retracting said disk conveying means to outside an area in which the disk can be handled by said disk conveying means when playing back the disk located at a playback position.

4. The disk apparatus according to claim 1, wherein said first locking lever pin and second locking lever pin moves in cooperation with the movement of the locking lever.

5. The disk apparatus according to claim 1, wherein said sliding plate has a rack member integrally formed into said sliding plate, so said rack member that engages with a pinion-type gear of a gear series to actuate said sliding plate.

6. The disk apparatus according to claim 1, wherein said first locking lever pin is engageably within confined said L-shaped groove so that said first locking lever pin achieves a locking position being pressed towards said locking portion of said L-shaped groove.

7. The disk apparatus according to claim 6, wherein said second locking lever pin which is engaged by said bisected, forked shaped member being disposed on said top portion of said sliding plate having said sliding plate being positioned furthest from a disk opening in said disk conveying direction.

8. The disk apparatus according to claim 1, wherein said first locking lever pin is engageably confined within said L-shaped groove so that said first locking lever pin is conveyed from said locking position of said L-shaped groove and said first locking lever pin is in transition between said locking position and a separate stop position different from said locking position within the said L-shaped groove.

9. The disk apparatus according to claim 8, wherein said second locking lever pin which is engaged by said bisected, forked shaped member being disposed on said top portion of said sliding plate having said locking lever moving in a corresponding tandem fashion to said sliding plate.

10. The disk apparatus according to claim 1, wherein said first locking lever pin is engageably confined within said straight portion of said L-shaped groove which is parallel to said disk conveyance path wherein said straight portion being furthest from said locking portion of said L-shaped groove.

11. The disk apparatus according to claim 10, wherein said second locking lever pin which is engaged by said bisected, forked shaped member being disposed on a top portion of said sliding plate so that said sliding plate is positioned closest to a disk opening as defined with a housing.

\* \* \* \* \*